US012005336B2

(12) United States Patent
Fountaine

(10) Patent No.: US 12,005,336 B2
(45) Date of Patent: Jun. 11, 2024

(54) TRAINING UTILIZING A TARGET COMPRISING STRIKE SECTORS AND/OR A MAT COMPRISING POSITION SECTORS INDICATED TO THE USER

(71) Applicant: The Idealogic Group, Inc, Las Vegas, NV (US)

(72) Inventor: Dennis Fountaine, San Diego, CA (US)

(73) Assignee: The Idealogic Group, Inc, Las Vegas, NV (US)

( * ) Notice: Subject to any disclaimer, the term of this patent is extended or adjusted under 35 U.S.C. 154(b) by 313 days.

(21) Appl. No.: 17/071,855

(22) Filed: Oct. 15, 2020

(65) Prior Publication Data

US 2021/0106896 A1 Apr. 15, 2021

Related U.S. Application Data

(60) Provisional application No. 62/915,382, filed on Oct. 15, 2019.

(51) Int. Cl.
*A63B 69/32* (2006.01)
*A63B 6/00* (2006.01)
*A63B 24/00* (2006.01)
*A63B 69/20* (2006.01)
*A63B 69/22* (2006.01)
(Continued)

(52) U.S. Cl.
CPC .......... *A63B 69/322* (2022.08); *A63B 6/00* (2013.01); *A63B 24/0062* (2013.01); *A63B 69/215* (2022.08); *A63B 69/22* (2022.08); *A63B 71/0622* (2013.01); *A63B 2024/0068* (2013.01); *A63B 2071/0625* (2013.01); *A63B 2071/0694* (2013.01); *A63B 2220/40* (2013.01); *A63B 2220/56* (2013.01); *A63B 2225/50* (2013.01); *A63B 2225/74* (2020.08); *A63B 2244/10* (2013.01); *H04L 67/12* (2013.01)

(58) Field of Classification Search
None
See application file for complete search history.

(56) References Cited

U.S. PATENT DOCUMENTS 8,337,366 B2 * 12/2012 Jones ................. A63B 24/0062
482/84
9,586,120 B1 * 3/2017 Sotelo ................ A63B 71/0669
(Continued)

*Primary Examiner* — Shila Jalalzadeh Abyaneh
(74) *Attorney, Agent, or Firm* — Peter Jensen-Haxel

(57) ABSTRACT

Disclosed is a method, a device, a system and/or a manufacture of training utilizing a target comprising strike sectors and/or a mat comprising position sectors indicated to the user. In one embodiment, a method for combat training, athletic training, and workout includes determining a position sector ID from a training file associated with a position sector visually identified on a mat including a position detector. A strike sector ID is determined associated with a strike sector on a strike target capable comprising a strike detector and capable of receiving a strike from a human extremity. A first indicator signal is generated to communicate the foot placement to the user and a second indicator signal communicates the strike sector. A strike signal is received from the strike and/or a position signal is received from the foot placement on the mat. The user's strike and/or positioning performance may be assessed.

16 Claims, 15 Drawing Sheets

(51) Int. Cl.
*A63B 71/06* (2006.01)
*H04L 67/12* (2022.01)

(56) References Cited

U.S. PATENT DOCUMENTS

| | | | |
|---|---|---|---|
| 2005/0209066 A1* | 9/2005 | Penney | A63F 13/833 |
| | | | 482/84 |
| 2006/0201580 A1* | 9/2006 | Kang | A63B 69/0053 |
| | | | 144/195.5 |
| 2008/0191864 A1* | 8/2008 | Wolfson | G06F 3/04815 |
| | | | 434/323 |
| 2011/0130183 A1* | 6/2011 | Pelletter | A63F 13/245 |
| | | | 463/7 |
| 2012/0021872 A1* | 1/2012 | Saha | A63B 69/0053 |
| | | | 482/8 |
| 2016/0263458 A1* | 9/2016 | Mather | G06V 40/28 |
| 2017/0036087 A1* | 2/2017 | Codrington | B32B 9/046 |
| 2020/0085297 A1* | 3/2020 | Woods | G09B 23/28 |

* cited by examiner

FIG. 8  Training File Setup Process Flow 850

*FIG. 9*  Training File Setup Process Flow 950

FIG. 10 Example Training Execution Process Flow 1050

FIG. 11 Machine Learning Difficulty Adjustment Process Flow 1150

FIG. 12   Augmented Reality System 1250

FIG. 13  Projection Overlay System
System 1350

Training and Workout System 1450

TRAINING UTILIZING A TARGET COMPRISING STRIKE SECTORS AND/OR A MAT COMPRISING POSITION SECTORS INDICATED TO THE USER

CLAIM FOR PRIORITY

This patent application claims priority from, and hereby incorporates by reference: U.S. provisional patent application No. 62/915,382, titled 'Combat Training Utilizing an Electronic Manikin, Extremity Device and/or Maneuvering Mat', filed Oct. 15, 2019.

FIELD OF TECHNOLOGY

This disclosure relates generally to equipment for combat training, workouts, and fitness, and electronic and computing control thereof, and more particularly to a method, a device, and/or a system of training utilizing a target comprising strike sectors and/or a mat comprising position sectors indicated to the user.

BACKGROUND

In the past several decades, martial arts, personal combat training, combat based workouts, and fitness challenges have grown in popularity. For example, martial arts may include Tae Kwon Do, Muay Thai, Brazilian Jiu Jitsu, Krav Maga, Karate, Judo, Kendo, Wing Chun, Boxing, Wrestling, Capoeira, Aikido, Sambo, Vale Tudo. Combat based workouts may have been based on motions from martial arts, for example, Tae Bo® and similar adaptations. Other fitness challenges which have grown in popularity include Crossfit®. Thus, a wide range activities exist which involve repositioning, striking with human extremities, and other martial-arts based motions, from experts learning traditional martial art forms in a dojo to consumers engaging in casual workouts at a gym.

Some martial arts, combat training, combat-based workouts, and fitness challenges are intended to be practices in groups, for example to practice proper form and receive peer and/or instructor feedback. Some aspects of a martial art or combat training can be improved through repetition, adapting to variation and surprise (which may be generally provided by individual sparring partners) and other forms of training. With respect to combat-based workouts and fitness challenges, it may be common for a leader and/or trainer to display a series of motions to be followed and repeated by a user.

Despite growing popularity, there can be challenges in learning, continuing to improve, and/or receiving a substantial workout. For example, there may be limited space available in classes, causing one to practice with a punching bag which may provide for limited interaction. Similarly, there may be limited time within a class to receive feedback from instructors (e.g., a sensei, trainers, leaders), inhibiting the rate of advancement in the martial art and/or personal fitness. Training partners may get tired, or it may be hard to find a partner of similar skill and/or athletic capability that will help a user to achieve the training or fitness they desire.

There is a need for continued innovation in training and workout equipment, systems, and methods that can improve the combat training, workouts, and fitness to a user, including to provide new challenge and opportunity for growth.

SUMMARY

Disclosed are a method, a device, and/or a system of training utilizing an electronic manikin comprising strike sectors and/or a mat comprising position sectors indicated to the user. In one embodiment, a system for combat training, athletic training, and/or workouts includes a manikin having a first set of one or more strike sectors capable of sustaining a strike from a human extremity. Each of the first set of one or more strike sectors includes a strike detector of the manikin and a strike indicator to provide a strike indication to a user applying the strike. The system includes a mat comprising one or more position sectors each including a position detector and a position indicator for providing a position indication of a foot placement for the user. The system includes a control unit communicatively coupled to the strike detector of the manikin and the detector of the mat, and further includes a processor and a memory storing a training file.

The memory also stores computer readable instructions that when executed on the processor initiate the training file to provide a combat training, an athletic training, and/or a workout. The computer readable instructions read a strike sector from the training file; and communicate to the user both a position sector for the foot placement of the user and a strike sector to receive the strike from the extremity of the user. The memory also stores computer readable instructions that when executed receive a first impact signal of the strike generated by the strike detector of the manikin and record the first strike signal in a first strike data and/or communicate the first strike data to the user.

The strike indicator may include a first lighting element embedded in the manikin, and communication to the user of the strike sector to receive the strike may include illuminating the lighting element embedded in the manikin. The position indicator may include a second lighting element embedded in the mat and communication to the user of the position sector for the foot placement may include illuminating the lighting element embedded in the mat.

The system may also include an augment marker visible in association with the manikin and/or the mat for positioning an augment image on a display screen and/or a transparency screen of a device when the manikin and/or the mat are visible to a camera of the device.

The strike indicator may include the augment image and the communication to the user of the strike sector to receive the strike may include overlaying the augment image on the manikin. Similarly, the position indicator may include the augment image and communication to the user of the position sector for placement of the foot may include overlaying the augment image on the mat.

The system may include a speaker communicatively coupled to the control unit. The memory may further include an audio file and store an audio designation data associated with a strike sector ID. The memory may further store computer readable instructions that when executed on the processor generates a sector callout on the speaker announcing the strike sector to receive the strike. The memory may further store computer readable instructions that when executed on the processor receive a first position signal of the foot placement generated by the position detector and record the first position signal in a first position data and/or communicate the first position data to the user.

The system may include an extremity device that is wearable on a human extremity which is communicatively coupled to the control unit through a network. The extremity device may include a device controller, a strike detector of the extremity device that upon the strike from the human extremity wearing the extremity device generates a second strike data of the extremity device, and/or a network interface controller for communicating the second strike data of the extremity device to the control unit. The memory further may store computer readable instructions that when executed on the processor: record the second strike data of the extremity device and/or communicate the second strike data of the extremity device to the user. The extremity device may be a glove, an elbow pad, a knee pad, a sock, and a shoe.

The strike detector of the manikin may detect the strike by detecting proximity with a first article wearable on a hand of the user and/or a second article wearable on the foot of the user. The position detector may detect an extremity placement by detecting proximity with the first article wearable on the hand of the user and/or the second article wearable on the foot of the user. The control unit may be implemented as an application of a mobile device communicatively coupled to f the manikin and/or the mat through a wireless network connection.

The manikin may include a head, a torso, a base, and an impact dampener connecting the base and the torso. The impact dampener may include a spring. A pressure sensor of the manikin may measure a pressure of the strike, and an accelerometer may measure an acceleration of at least one of the manikin, the head, and/or the torso following the strike. The manikin may also include a display screen embedded in the head and protected by a transparent impact shield for displaying a face image.

In another embodiment, an apparatus for combat training, athletic training, and workouts includes a head having a first set of one or more strike sectors capable of sustaining a strike from a human extremity, each of the first set of one or more strike sectors including a strike detector embedded in the head and a strike indicator comprising a lighting element embedded in the head. A torso coupled to the head includes a second set of one or more strike sectors capable of sustaining the strike from the human extremity. Each of the second set of one or more strike sectors includes the strike detector embedded in the torso and the strike indicator comprising the lighting element embedded in the torso.

A processor communicatively is coupled to each instance of the strike detector and each strike indicator of the first set of one or more strike sectors. The processor is also communicatively coupled to each instance of the strike detector and each strike indicator of the second set of one or more strike sectors. The apparatus also includes memory communicatively coupled to the processor. The memory stores a training file to provide combat training and/or a combat-based workout. The memory may further store computer readable instructions that when executed on the processor: initiate the training file; read a strike sector from the training file; illuminate the lighting element of the strike indicator; generate strike data of the strike detected by the strike detector; and record the strike data in a performance file.

In yet another embodiment, a method for combat training, athletic training, and workout includes determining a position sector ID from a training file stored in a computer memory, the position sector ID associated with a position sector visually identified on a mat capable of detecting a foot placement of a user. The mat includes a position detector associated with the position sector for detecting the foot placement of the user within the position sector visually identified on the mat.

The method determines a strike sector ID associated with a strike sector on a strike target capable of receiving a strike from a human extremity of the user. The strike target includes a strike detector associated with the strike sector for detecting the strike from the user. A first indicator signal for indicating the position sector associated with the position sector ID is generated to communicate the foot placement to the user. The method then generates a second indicator signal for indicating the strike sector associated with strike sector ID to communicate the strike sector to the user. A strike signal is received, the strike signal generated by the strike detector when the user applies the strike from the human extremity to the strike target at the strike sector. The method may similarly receive a position signal generated by the position detector when the user places the foot placement within the position sector visually identified on the mat.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device, and/or system of training utilizing a target comprising strike sectors and/or a mat comprising position sectors indicated to the user. Although the present embodiments have been described with reference to specific example embodiments, it will be evident that various modifications and changes may be made to these embodiments without departing from the broader spirit and scope of the various embodiments.

Figure 1:
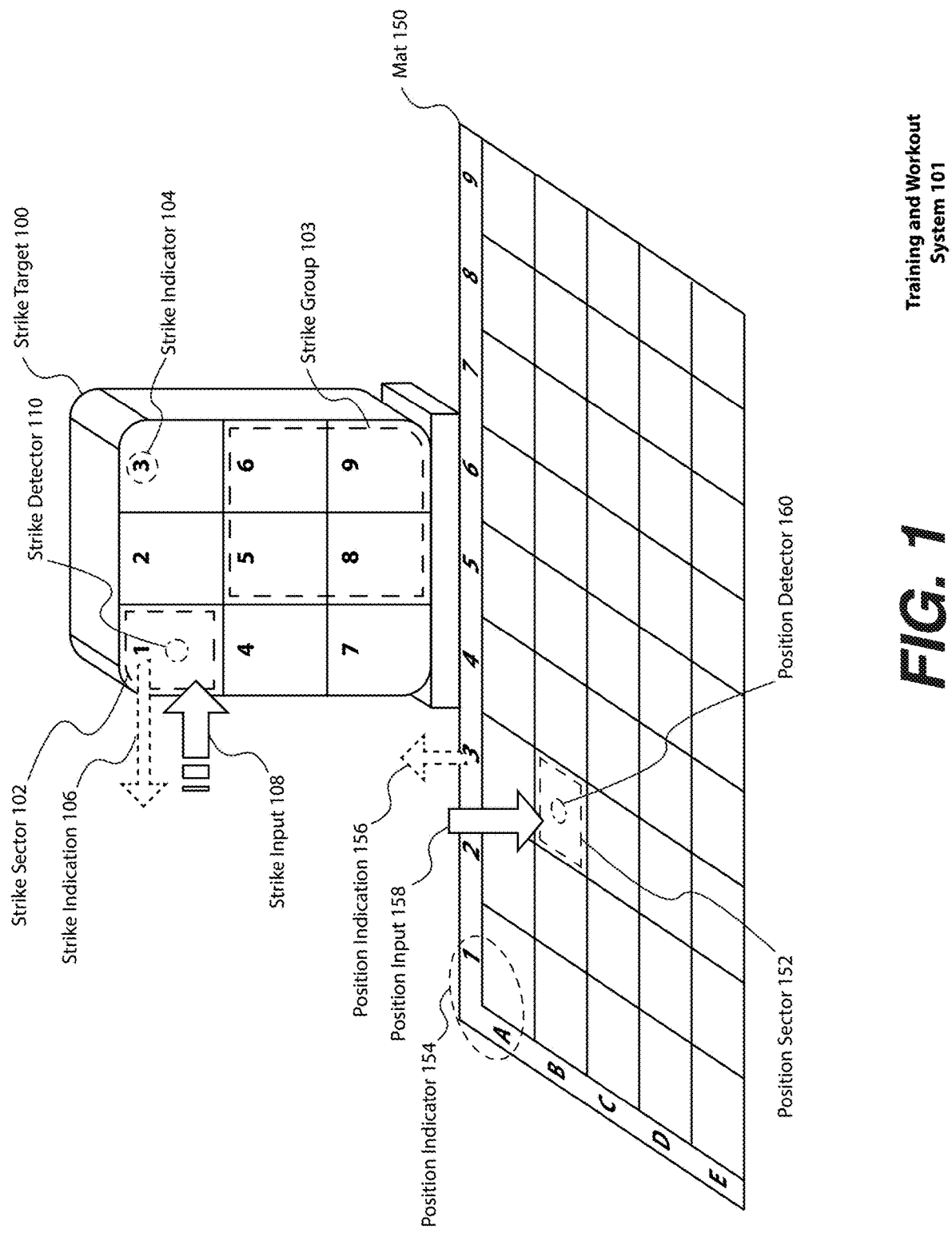
FIG. 1 illustrates a training and workout system comprising a strike target for receiving a strike from a user and a mat for a foot placement or other extremity placement of a user, a position indication indicating a position sector(s) for the foot placement, and a strike indication indicating to the user a strike sector on which to apply a strike, the position indication and the strike indication capable of execution according to a training file that may be of varying challenge and adaptable to many forms of martial art, combat training, or fitness routine, with positionings and/or strikes of the user able to be recorded and/or assessed for performance, according to one or more embodiments.

FIG. 1 illustrates a training and workout system 101, according to one or more embodiments. The strike target 100 may be utilized, for example, to provide training for martial arts strike, martial arts simulated sparring, rapid and/or precise attack and/or defensive motions, and/or for upper body workout and fitness. The strike target 100 may include one or more strike sectors 102 (optionally grouped as a strike group 103). Each strike sector 102 may have one or more strike indicators 104, which, in the present embodiment is illustrated as a visual indicator, a number '1' through '9'. The user receives a strike indication 106 (e.g., a sound, a visual) designating the strike sector 102 on which to apply a strike input 108 to a strike detector 110. A strike detector 110 may generate a strike signal and transmit the signal to one or more communicatively coupled devices (e.g., the strike signal 111 communicated to the control unit 500 of FIG. 5). For example, the user may be instructed to strike the punch strike sector 102 labeled '6' through hearing an audible callout "punch six", "right hand punch six", or "right hook six". In one or more embodiments, the strike indication 106 may have been provided through execution of a training file 600, as shown and described in conjunction with FIG. 6 and throughout the present embodiments.

In one or more embodiments, the mat 150 includes a set of position sectors 152, identified and/or designated with a position indicator 154. Each position sector 152 may include a position detector 160 for detecting a foot placement of the user (and/or contact from another part of an extremity such as a hand or knee). The mat 150 may be utilized, for example, to provide training for positioning, stance, rapid and/or precise movements and repositioning, simulated martial arts sparring, achieving a certain position from which to apply a strike to the strike target 100, and/or for workout and fitness of the lower body. The user may receive a position indication 156 (e.g., a visual, a sound) from a position indictor 154 (e.g., a visual numbering, an augmented reality image, a lighting element) associated with a position sector 152. The position indication 156 communicating to the user an instance of the position sector 152 on which to place an extremity. Placement of the extremity generates a position input 158, which may be detected and/or sensed by the position detector 160.

For example, in the embodiment of FIG. 1, the position indicator 154 is a pair of cross-referencing letter and number, from 'A' to 'E' and '1' to '9', respectively, forming forty-five instances of the position sector 152. The user may be instructed to seek a position on the position sector 152 for B-3' by an audible callout "B-9" (e.g., a sector callout 109 of a strike sector 102). In one or more embodiments, the position indication 156 may have been provided through execution of a training file 600, as shown and described in conjunction with FIG. 6. When the user places an extremity on the position sector 152 for B-3', they may apply the position input 158 detected by a position detector 160, which may generate a signal transmitted to one or more devices and/or control systems (e.g., the position signal 161 communicated to the control unit 500 of FIG. 5). The nature of the positioning may be compared to and assessed against to a baseline to determine performance (e.g., a benchmark quality data 622), as shown and described throughout the present embodiments and in FIG. 6. In one or more embodiments, the mat 150 may be used alone, or in combination with the strike target 100.

In one or more embodiments, the mat 150 may be made from a thin foam rubber with hollows for installation of the position detectors 160 and/or wiring. The position detectors 160, in one or more embodiments, may be pressure sensors. The pressure sensors ma have the ability to both detect a binary pressure (e.g., either on or off), and/or measure variable pressure and/or weight of the position input 158.

Figure 2:
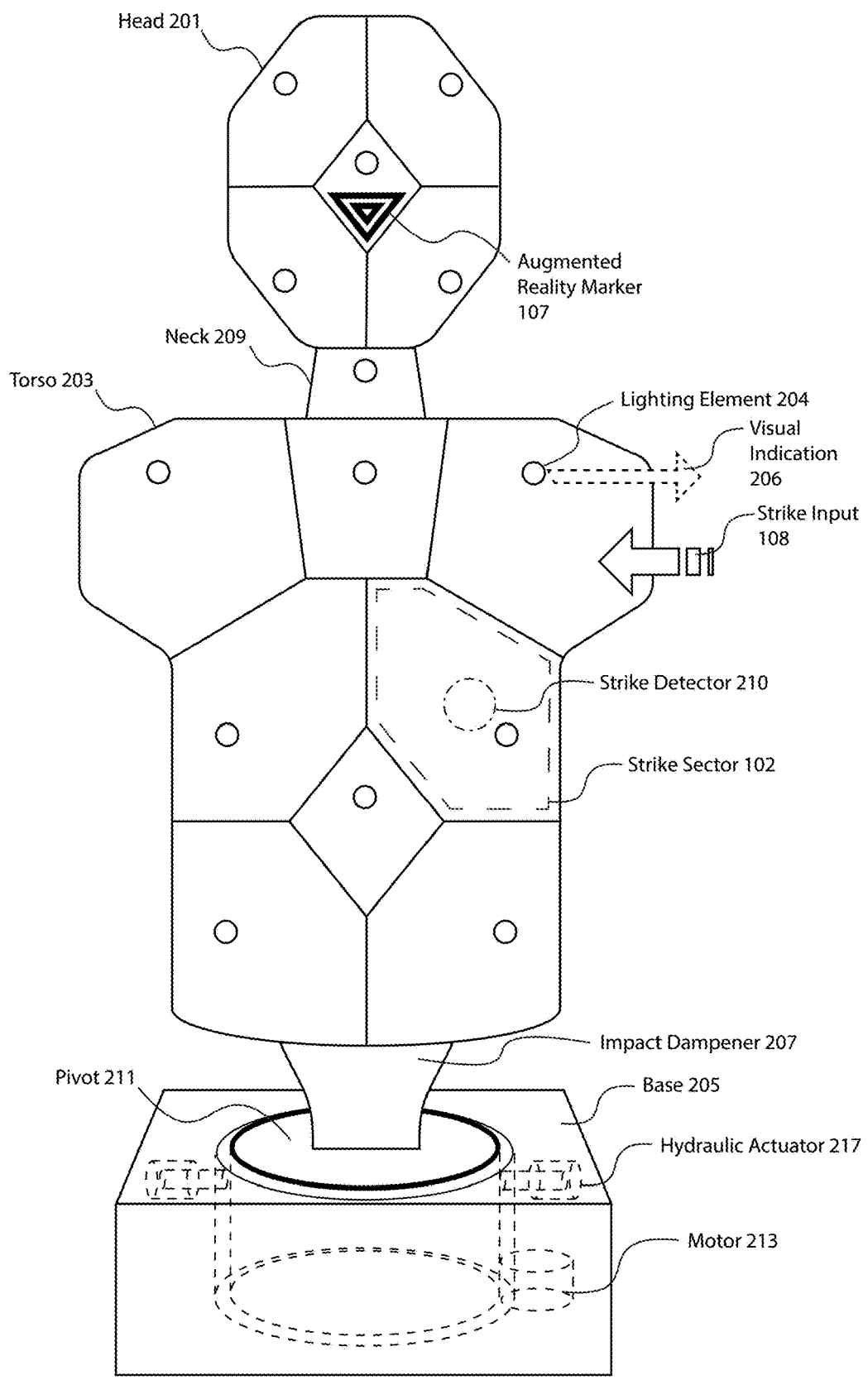
FIG. 2 illustrates a manikin as an instance of the strike target of FIG. 1, the manikin providing a set of strike sectors each having a lighting element to provide a visual indication and a strike detector to generate a strike signal when receiving a strike input from the user, and further illustrating an augment marker for positioning an augment image (e.g., an overlay on the strike target as viewed through AR glasses) including to provide strike indications, according to one or more embodiments.
Figure 14:
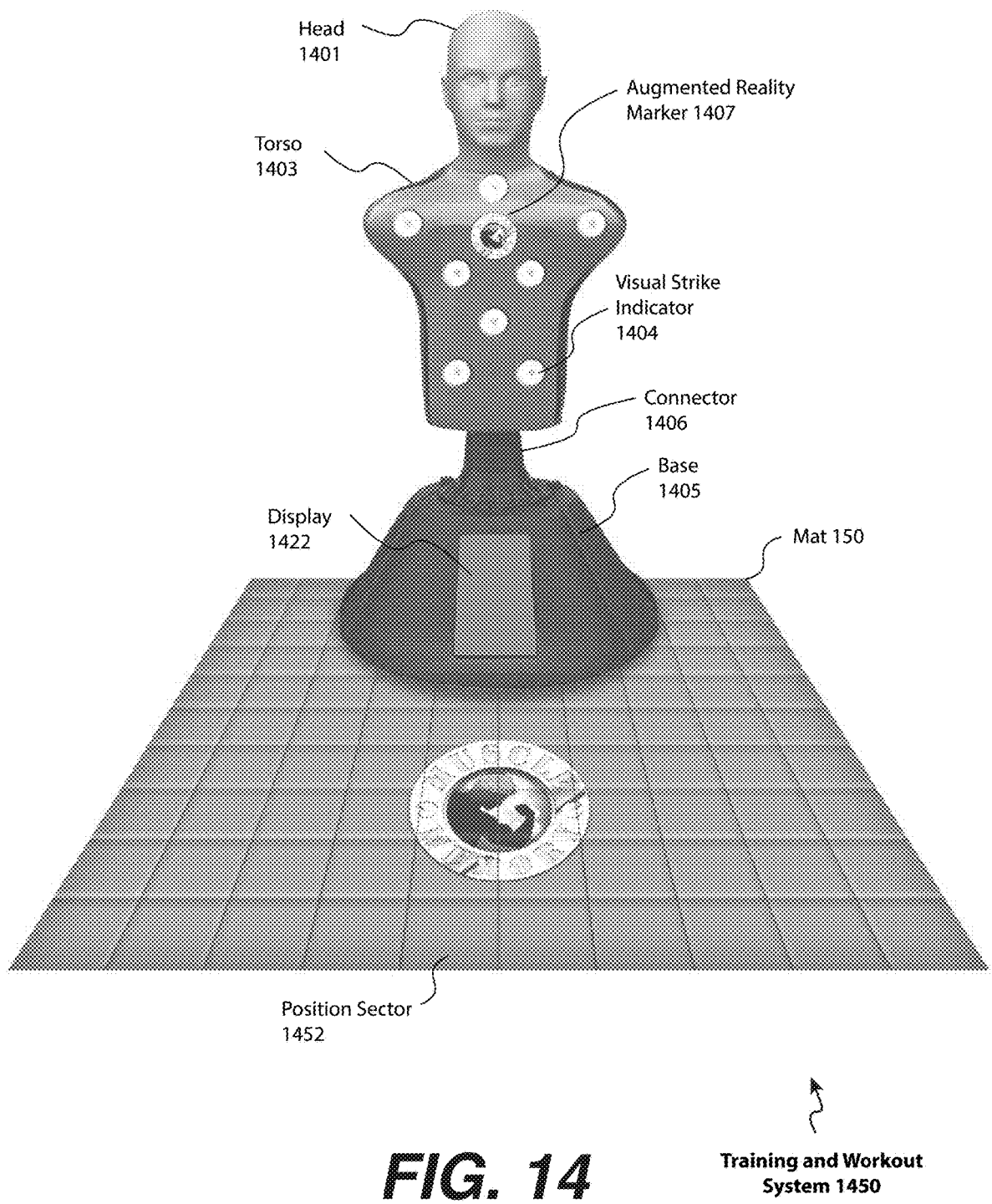
FIG. 14 illustrates a training and workout system that may be a specific example embodiment of the strike target and the mat, according to one or more embodiments.

The strike target 100 may be made be of suitable construction for receiving strikes, for example based on modification of a punching bag (e.g., a traditional cylindrical punching bag, a round punching bag, a double-ended heavy punching bag, an 'uppercut' punching bag), or a training manikin (e.g., as shown and described in conjunction with the embodiment of FIG. 2 and FIG. 14). For example, the strike detector 110 may be placed on the interior of a durable synthetic polymer covering, with each strike sector 102 and/or each strike group 103 printed on an exterior of the covering. The strike target 100 should be of sufficient weight, or sufficiently secured, as sustain strikes without toppling over.

In one or more embodiments, the training and workout system 101 comprises a strike target 100 and a mat 150, although ether may be used independently, in one or more embodiments, to provide training and/or a workout. In one or more embodiments, multiple instances of the strike target 100 may be used with a mat 150 (e.g., two instances of the strike target 100, with one on two opposing sides of a rectangular instance of the mat 150). In one or more embodiments, the mat 150 may surround the entire instance of the strike target 100, such that the user may moving in 360 degrees around the strike target 100. In one or more embodiments, one of the strike target 100 and the mat 150 may include detectors, while the other does not. For example, the user may be instructed to achieve a position on the mat 150 but only have the strike input 108 detected through the strike detector 110.

FIG. 2 illustrates a manikin, according to one or more embodiments. In one or more embodiments, the manikin 200 may be used to train and/or educate a user to practice martial arts, workout, and/or perform fitness routines. Specifically, the manikin 200 may be a target on which to perform strikes, for example with the extremity of the user such as a hand or foot, at various times, qualities, and/or locations. The manikin 200 may therefore provide combat training, sparring analytics (e.g., impact force, speed, and/or timing), challenge, and/or workout.

The manikin 200 can include one or more discernable body parts, such as a head 201, a torso 203, and a neck 209 connecting the head 201 and the torso 203. The torso 203 can be connected to a base 205 utilizing a connector (e.g., the connector 1406 of FIG. 14). The base 205 may be sufficiently weighted to keep the manikin 200 from tipping over when struck by a human extremity. Alternatively, or in addition, the base 205 may permit bolting or fastening to a surface such as a floor or flanges or other fasteners for fastening to a wall. The connector between the torso 203 and the base 205 may include an impact dampener 207, for example a coil spring and/or a leaf spring, to help in absorbing impact on the manikin 200 and reducing injury to a user. In one or more other embodiments, the manikin 200 may be hung or mounted and therefore include no base 205 or connector.

The manikin 200 may be divided into two or more strike sectors 102. In the embodiment of FIG. 2, the head 201 includes five strike sectors 102, the neck 209 includes one strike sector 102, and the torso 203 includes eight strike sectors 102 (all except one of which are unlabeled in the present embodiment). As shown and described in the embodiment of FIG. 5, each strike sector 102 includes a visual strike indicator that may be a lighting element 204, and a strike detector 210 (the strike detector 210 is illustrated beneath a surface of an exterior of the manikin 200 through the dot-dashed lines).

In response to a visual indication 206, for example an illumination of the lighting element 204, a user (e.g., the user 1200 of FIG. 12) strikes the manikin 200 with an extremity. The visual indication 206 may occur according to a pattern, program, and/or routine. The extremity for example is one known in the martial arts, for example a hand, fist, elbow, shoulder, knee, and/or foot. Additional means of providing a non-extremity body strike (e.g., a forehead) are also possible. It is also possible for a training and/or sparring weapon to be utilized such as a wooden or plastic sword or other martial weapon. The strike provides a strike input 108 that may be measured, recorded, and/or analyzed as shown and described in conjunction with FIG. 6.

In one or more embodiments, the strike sectors 102 may be designed for general areas of human anatomy. For example, the head 201 may include a right-side sector, a left-side sector, a top sector, a bottom sector, and a central sector, as shown in the embodiment of FIG. 2. In one or more other embodiments, the head 201 may include four sectors (e.g., each may be referred to as a quadrant sector).

In one or more embodiments, the strike sectors 102 may be designed for specific areas of human anatomy. For example, at least one of the one or more strike sectors 102 of the torso 203 may comprise a visual delineation that is a pectoral sector, a sternum sector, an abdominal sector, a solar plexus sector, a kidney sector, a collar sector, a shoulder sector, an arm sector, a hypochondrium sector, a epigastric sector, an umbilical sector, a lumbar sector, an iliac sector, and/or a hypogastric sector. Similarly, the head 201 may comprises a visual delineation that is a face sector, chin sector, a throat sector, a forehead sector, a nose sector, an eye sector, an ear sector, a mouth sector, and/or a cheek sector. In one or more other embodiments, there may be strike detectors 210 in one or more of body part locations lacking visual delineations and/or which may have visual designation and/or delineation applied through augmented reality and/or projection, as further shown and described in conjunction with the embodiments of FIG. 13 and FIG. 14.

The manikin 200 may include a display screen (e.g., the display screen 522 of FIG. 5, not shown in the embodiment of FIG. 2) that may provide instruction, encouragement, assessment, feedback and/or other interaction with the user. In one or more embodiments, the display screen may be located in the head 201 or in the torso 203 behind an impact-resistant material such as polycarbonate or acrylic plastic.

In one or more embodiments, the manikin 200 may include an augment marker 107 (e.g., for an augmented reality image) that may provide a recognition target for an image recognition process detecting data generated by a camera (e.g., the camera of a device 560 of the user such as a smartphone, a set of AR glasses, etc.). An augment image may be projected and/or overlaid on the manikin 200 on an electronic display (e.g., on a smartphone screen), or on a transparency screen (e.g., AR glasses). The augment image may be placed proximate to and/or relative to the augmented reality marker 107. For example, a face can be projected over the head 201 such that a face talks (e.g., in coordination with speech from the speaker 520) to provide instruction matching the visual strike indicators (e.g., "hit in the left shoulder"), look menacing while the user is engaging with the manikin 200, and/or provide a reaction when the user strikes the manikin 200 as may be detected by a strike detector 210 and/or an accelerometer 211.

In one or more embodiments, and the embodiment of FIG. 2, training and/or instruction may be provided to the user. A display screen 522 may be set in the base 205 of the manikin 200 (not shown) to provide instructional videos. The training file 600 may include an association with additional audio-visual instructions before, during, between, and/or after execution of the training file 600 and/or collection of data from the performance file 625.

In one or more embodiments, the manikin 200 may be able to change positions, including rotational movement, lateral movement, and/or vertical movement. For example, the connector between the torso 203 and the base 205 may capable of rotational movement through a pivot 213 operated by a motor 215 (e.g., a step motor). In one or more other embodiments, a free-floating drum similar to those utilized in a washing machine may be utilized. The free-floating drum permit rotational movement, some limited lateral and/or vertical movement, and may also partially act as an impact dampener 207 when receiving strikes from the user. Rotational movement may be imparted through use of the motor 215. Lateral and/or horizontal motion may be imparted through one or more motors, pneumatic elements, and/or hydraulic driven pushing/pulling elements that may apply force to one or more sides of the drum. In the embodiment of FIG. 2, two opposed instances of a hydraulic actuator are shown (one is labeled, the actuator 217). A position may be specified by a target position ID 620, as shown and described in conjunction with the embodiment of FIG. 6. Motion of the floating tub may be measured to collect performance data, for example, the strike quality data 642 of FIG. 6.

Figure 3:
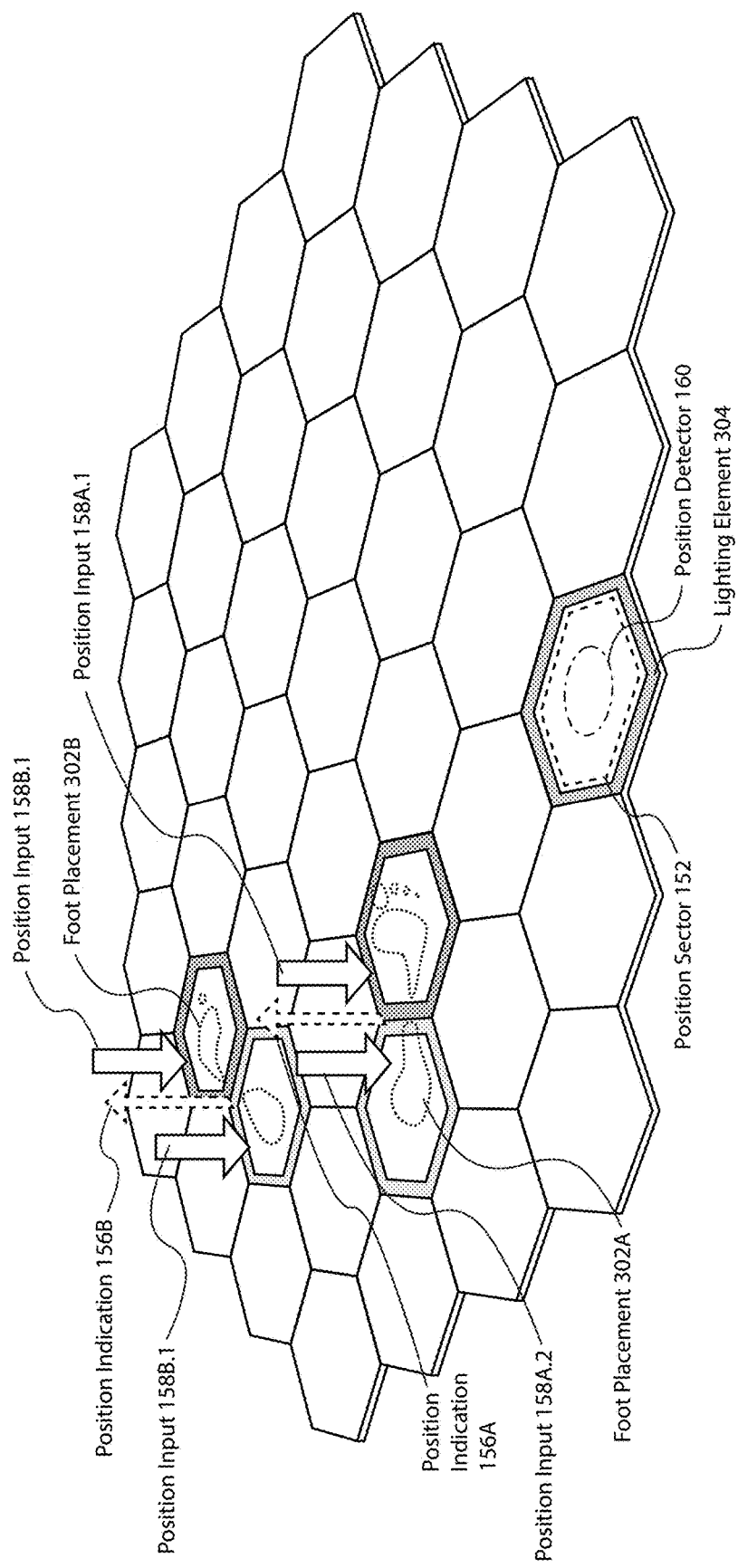
FIG. 3 illustrates a maneuvering mat that is an instance of the mat of FIG. 1 that may assist the user in positioning and/or maneuvering in an area around the strike target, the maneuvering mat including a set of hexagonal position sectors each having a lighting element to provide a position indication and each position sector about half the size of a human foot, e.g., such that a foot placement can provide a position input on both a ball of the foot and a feel of the foot, according to one or more embodiments.

FIG. 3 illustrates a maneuvering mat 300, according to one or more embodiments. FIG. 3 illustrates a maneuvering mat 300 that may be used alone or in combination with the manikin 200 (e.g., to form an instance of the training and workout system 101), according to one or more embodiments. In the embodiment of FIG. 3, the maneuvering mat 300 can lay substantially flat on surface such as a floor and comprises two or more position sectors 152. Each position sector 152 includes a position indicator 154, and specifically a lighting element 304 around the parameter of each position sector 152, for indicating a location to the user. Each position sector 152 may also include a position detector 160 to detect when the user is located at the position sector 152 (e.g., where the user is making contact with and/or applying pressure to). The position detector 160 may utilize similar means to the strike detector 110. However, in one or more preferred embodiments the position detector 160 detects a pressure of the user standing and/or otherwise exerting pressure on the maneuvering mat 300 which may provide an additional instructional opportunity to the user (e.g., through an instruction on how much pressure to apply and/or another quality of placement as may be gathered, recorded, and assessed). While the position sectors 152 are shown in a hexagon tessellation, other patterns, such as a grid, are also possible. In one or more embodiments, the patterns or markings may be custom tailored for a given martial art.

The position indicator 154 and the position detector 160 are communicatively coupled to the control unit 500, for example by direct wiring, direct wireless connection, and/or through the network 501 (not shown). The training file 600 of FIG. 6 may include additional entries (e.g., a position sector ID 602, a visual designation of the position (e.g., a visual designation data 610), an audio designation of the position (e.g., an audio designation data 612), and/or a time of the position (e.g., a time 616). As shown and described in the embodiment of FIG. 5, the training execution routine 512 may therefore be able to indicate to the user where to place their feet before, during, between, and/or after each extremity strike. Similarly, the user performance file 625 may include position data specifying the position sector ID 602, position quality data 632, and/or the time 634 of the position. Although the maneuvering mat 300 may be seen as providing instruction and training related to foot placement, additional extremities (e.g., knees, hands, etc.) and/or martial extensions (e.g., a sword, a staff, etc.) may be specified and tested. This may be especially useful for martial arts in which hands may frequently touch the group (e.g., Capoeira).

In the embodiment of FIG. 3, what may be a more complex example of a foot placement 302 is provided. Specifically, four instances of the position sector 152 are indicated: two instances of the position sector 152 corresponding to a position indication 156A for a right foot placement and two instances of the position sector 152 corresponding to a position indication 156B for a left foot placement. In one or more embodiments, a front portion of the foot (e.g., a ball of the foot and toes) may have a certain indication (e.g., a bright illumination of a lighting element 304) and the back portion of the foot (e.g., a heel) may have a different indication (e.g., a dim illumination of a lighting element 304). The user may then find the appropriate position such that the foot placement 302A provides the position input 158A.1 (front of the foot) and the position input 158A.2 (back the of foot). Similarly, the user may find the foot placement 302B to provide the position input 158B.1 (front of the foot) and the position input 158B.2 (back of the foot). The example embodiment of FIG. 3 may therefore provide the additional opportunity of assessing, for example as performance data, the distribution of weight between the ball of the foot and the feel of the foot and/or determining balance through assessment of the dynamic distribution of weight between the ball of the foot and the heel of the foot.

Figure 4A:
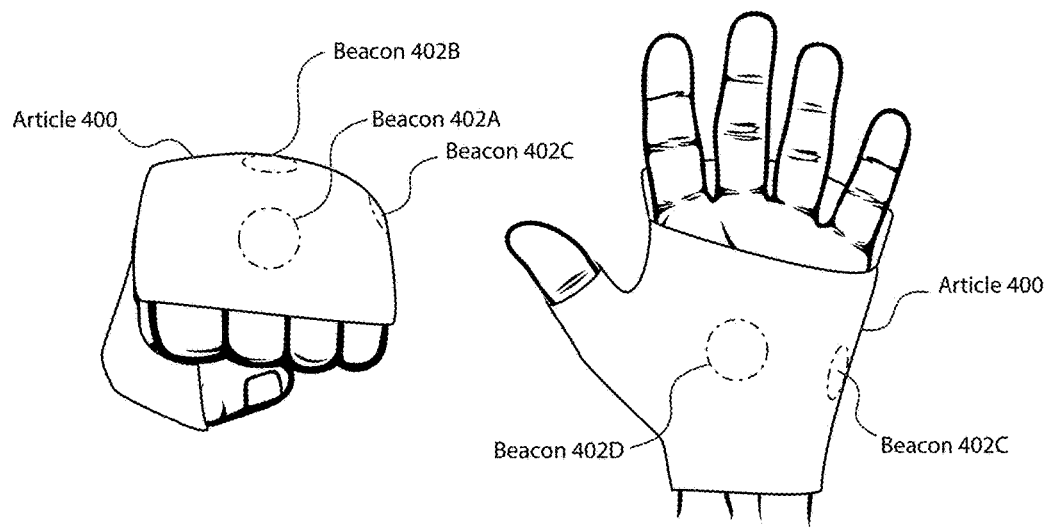
FIG. 4A illustrates an article attachable to a hand of the user to apply the strike to the strike target and/or the positioning on the mat, including one or more beacons that may be sensed by the strike target and/or the mat to generate the strike signal and/or the position signal, according to one or more embodiments.

FIG. 4A illustrates an article attachable to an extremity of the user for detection of contact between the extremity and the strike target 100 and/or the mat 150, according to one or more embodiments. In one or more embodiments, the articles may include detectable and/or sensible elements, referred to herein as "beacons," for example based on near-field communication, RFID, magnetic sensing, magnetic field sensing, and/or other devices, systems, and methods for sensing proximity as may be known in the art.

In the embodiment of FIG. 4A, a hand of a user is shown as a fist and open to demonstrate an example positioning of a set of four beacons 402, the beacon 402A through the beacon 402D. The beacon 402A may be placed on a fist region of the hand, a beacon 402B may be placed on a back of the hand, the beacon 402C may be placed across the hand opposed to the thumb, and a beacon 402D may be placed on a palm of the hand. Each of the beacons 402 may cause generation of the strike signal 111 from a strike detector 110 capable of sensing the beacon 402 and/or the position signal 161 from a position detector 160 capable of sensing the beacon 402. In one or more embodiments, the beacon 402 may be distinguished depending on the part of the hand (e.g., an "extremity sector") which applies the strike input 108 and/or the position input 158, for example through a different near-field communication identifier or magnetic signal. For example, where the strike detector 110 senses the beacon 402A, data may be stored in the performance file 625 (e.g., within the strike data 640 and/or the extremity data 650) specifying the extremity sector with which the strike was make. The extremity device 700 of FIG. 7 may have similarly located strike detectors 710 to each of the beacons 402 of FIG. 4A.

Figure 4B:
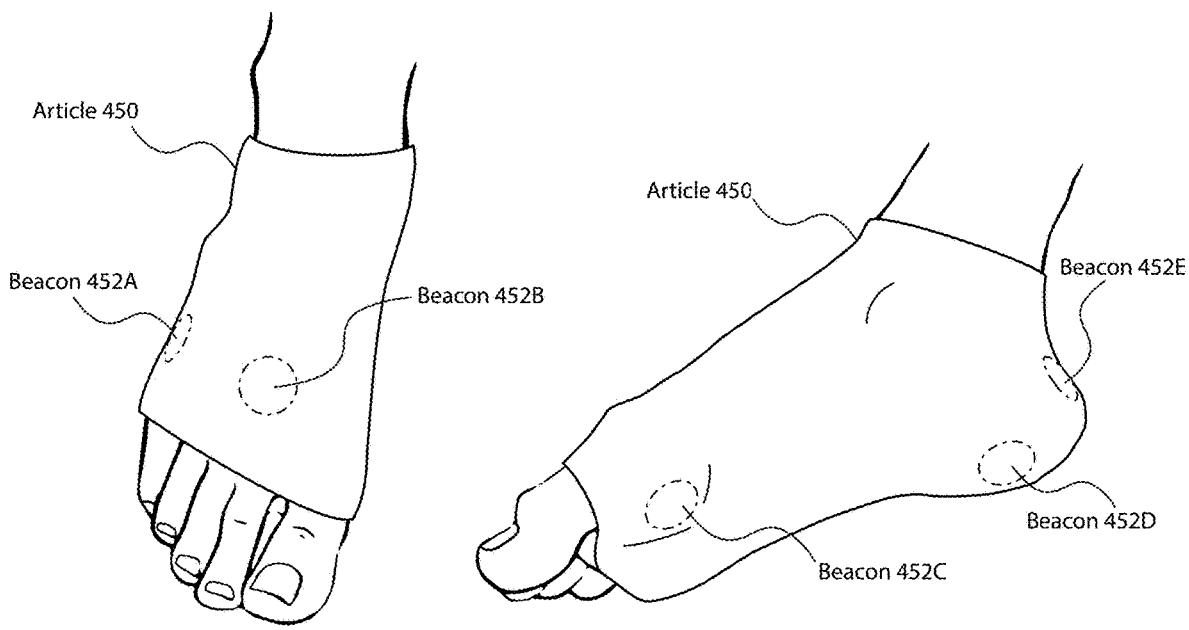
FIG. 4B illustrates an article attachable to a foot of the user to apply the strike to the strike target and/or the positioning on the mat, including one or more beacons that may be sensed by the strike target and/or the mat to generate the strike signal and/or the position signal, according to one or more embodiments.

FIG. 4B similarly illustrates five beacons 420 located on an outside of edge of the foot (e.g., the beacon 452A), an instep (the beacon 452B), a ball of the foot (the beacon 452C), a bottom-heel (the beacon 452D), and an aft-heel just below the achilleas heel (the beacon 452E). The extremity device 700 of FIG. 7 may have similarly located strike detectors 710 to each of the beacons 452 of FIG. 4B.

Figure 5:
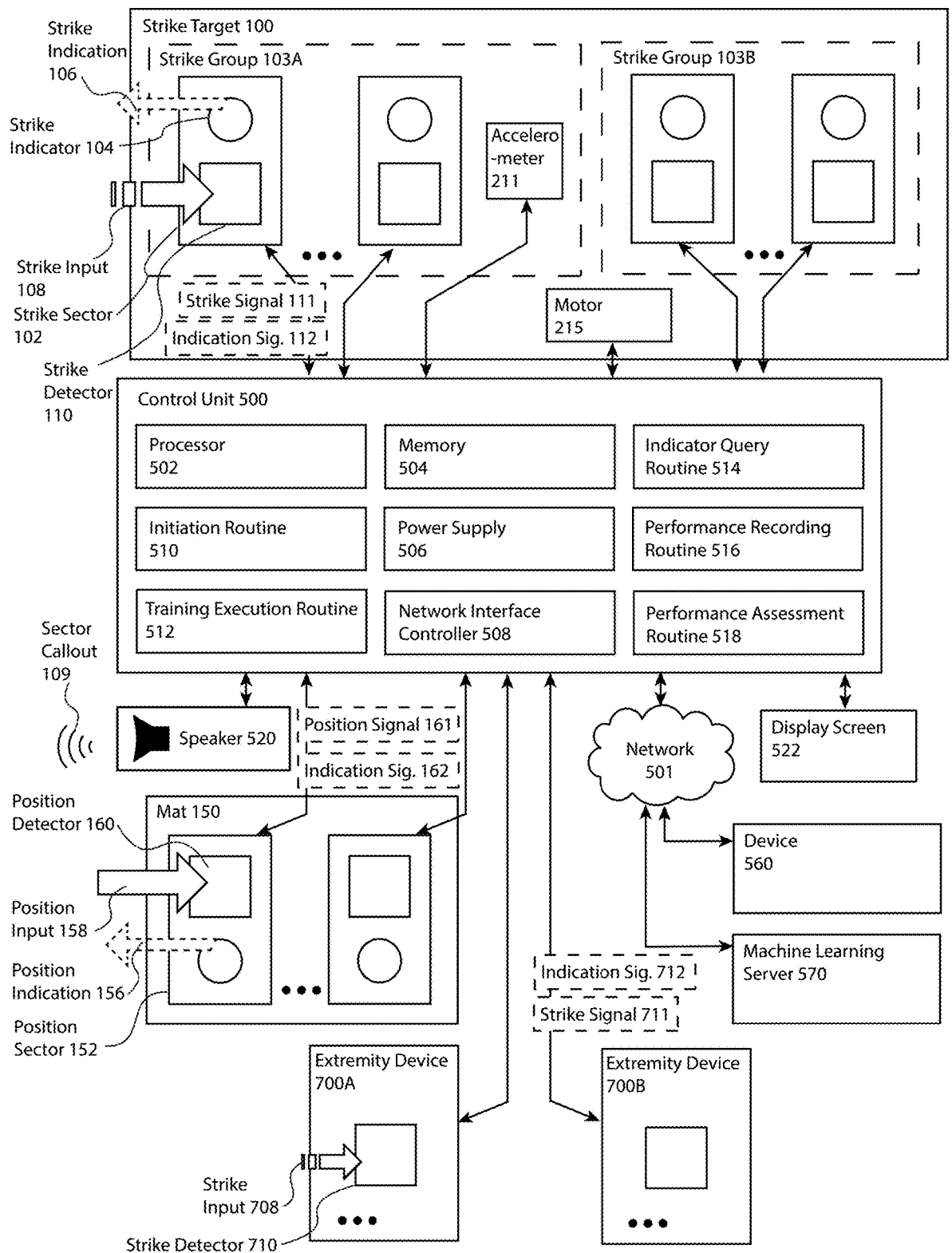
FIG. 5 illustrates a control view including a control unit for controlling strike indications, position indications, target positions, and other functions, and further illustrating additional possible system components including communicative coupling to the strike target, the mat, one or more extremity devices, a user device (e.g., a smartphone), a speaker that can provide a sector callout as an audible indication, a display screen for providing instruction and/or feedback, and/or a machine learning server for analyzing and predicting difficulty, according to one or more embodiments.

FIG. 5 is a control view 550, according to one or more embodiments. A control unit 500 includes a processor 502 (e.g., an i7 Intel® chip, a PIC microprocessor), a memory 504 (e.g., RAM, solid state memory, a magnetic disk), a power supply 506, and may include a network interface controller 508 and communicative coupling to a speaker 520.

In one or more embodiments, the control unit 500 may be communicatively coupled to the strike target 100. For example, the control unit 500 may be communicatively coupled to the indicators and/or detectors of one or more strike groups 103 (e.g., shown as the strike group 103A through the strike group 103N). Each instance of the strike group 103 may be based on regions of the manikin 200. For example, a strike group 103A may be defined for instances of the strike sector 102 on the head 201 of the manikin 200 and the strike group 103B may be defined for instances of the strike sector 102 on the torso 203. Each strike group 103 comprises one or more instances of the strike sector 102. In one or more embodiments, each strike sector 102, in turn, comprises at least one strike indicator 104 and one strike detector 110, according to one or more embodiments.

The strike indicator 104 could be an audible reference to a visual strike indicator an audible voice callout from the speaker 520 referring to a static numbering or graphic (e.g., the sector callout 109). For example, the strike indicator 104 may be an easily visible number as shown and described in the embodiment of FIG. 1, and the sector callout 109 may be audio that communicates a series of strikes such as "Section one, two, one, four, eight, one". The static images may be a decal and/or printed on the strike target 100 and/or the manikin 200. However, in one or more preferred embodiments, the strike indicator 104 is an a light (e.g., an LED light) capable of illumination under control of the control unit 500 (e.g., through specification in the training file 600 via the visual designation data 610 of the strike sector ID 604). The strike indicator 104 may be initiated using an indicator signal 112.

The strike detector 110 is a sensor and/or a detector generating an electronic impulse upon sensing the strike input 108 in all or a subset of the area of a strike sector 102. The strike detector 110, for example, can be based on a pressure sensor, a resistive sensor, a capacitive sensor, a surface acoustical wave sensor, a magnetic sensor, and/or an infrared sensor. The strike detector 110 can also be based on contact or proximity sensing with article 400, the article 450, and/or the extremity device 700. For example, the strike detector 110 can be based on a near-field communication sensor and/or an RFID sensor. The strike detector 110 may be able to detect both that the strike occurred, but may also generate data related to the quality of the strike. For example, depending on a measuring capability of the strike detector 110, the strike detector 110 may be able to measure the force and/or pressure of the strike input 108, a contact time of the strike input 108, and/or a spatial accuracy (e.g., the distance away from the strike detector 110 the strike input 108 was provided.

One or more of the strike groups 103 may also include one or more accelerometers 211. The accelerometer 211 may be used to detect the strike input 108 and/or generate additional data related to the strike impact 118. The accelerometer 211 is communicatively coupled to the control unit 500.

The control unit 500 may be connected to a display screen 522, for example as shown and described in conjunction with FIG. 14. The display screen 522 is an electronic display screen suitable for displaying text and/or graphics. For example, the display screen 522 may be an LCD and/or an OLED screen. The memory 504 may store data to be presented to the user on the display screen 522, such as graphics (e.g., a face), video instructions (e.g., the video files 617 of FIG. 6), written instructions, feedback (e.g., measured force), or indicators of a strike sequence. The data may be presented before, during, and/or after execution of the training file 600. The display screen 522 may be placed behind an impact-resistant, substantially transparent material such as polycarbonate plastic, Plexiglas®, or other materials sufficient to withstand impact from a human extremity or sparring weapon (e.g., a wooden sword, a bamboo staff, etc.). Such impact shield, in one or more embodiments, may be one-quarter inch thick clear polyacrylamide. In one or more embodiments, the display screen 522 may be located such that the likelihood of being struck by the user is low, for example located in the base 205 of the manikin 200. In one or more other embodiments, the display screen 522 may not be integrated in the strike target 100 but the function may instead be carried out by another device communicatively coupled through the network 501 to the control unit 500. For example, a smartphone of the user may be utilized for the function of the display screen 522 (e.g., the device 560, as described below).

The control unit 500 may also be connected to a network 501, for example through a local area network (LAN), wide area network (WAN), and/or the Internet. The strike detector 110, the strike indicator 104, the accelerometer 211, the position sector 152, the extremity device 500A and the extremity device 500B, the speaker 520, and the display screen 522 are shown with a direct connection, however to the control unit 500 (e.g., a wired connection, a Bluetooth® connection), any of such elements may alternatively or in addition be connected to the control unit 500 through the network 501, for example via a Bluetooth® or WiFi connection.

In one or more embodiments, the control unit 500 may be connected to and/or contained within the strike target 100 and/or the mat 150, including a power supply 506 that may be a battery and/or a wired power source such as from a wall socket to 120V and/or 240V alternating current power that may be converted to direct current. In one or more alternate embodiments, or one or more elements of the control unit 500 may be implemented partially as an application on a computing device, e.g., the device 560. The application, for example, may be a smartphone application, a desktop application and/or a process running on a remote server communicatively coupled to the control unit 500 through the network 501. In one or more embodiments, the control unit 500 may be implemented as an application of a mobile device (e.g., a smartphone such as an Android Phone or an iPhone, a tablet device such as an iPad, etc.) communicatively coupled to at least one of the strike target 100 and the mat 150 through a wireless network connection.

In one or more embodiments, an initiation routine 510 comprises computer readable instructions that when executed on the processor 502 receives a selection of the training file 600 and initiates the training file 600 for execution. The control unit 500 comprises a training execution routine 512 which reads the training file 600 to lead the user through an exercise, training, testing, sparring, and/or physical challenge using the strike target 100, the mat 150, and/or the extremity device 700. The training execution routine 512 may include computer readable instructions that define how to read the training file 600. For example, the training execution routine 512 may specify a mode in which the entire training file 600 is to be indicated to the user before the user strikes the strike target 100 and/or finds positions on the mat 150. In one or more other embodiments, the training execution routine 512 may read each entry (e.g., designated by each entry ID 601 in FIG. 6) and the user may then provide a matching position input 158 and/or strike input 108. Additional data can be stored in the in the training file 600 specifying indicators to be triggered in association with the extremity device 700, e.g., the haptic designation data 623 and/or the audio designation data 612, as shown and described in FIG. 6.

In one or more embodiments, the training execution routine 512 comprises computer readable instructions that when executed on the processor 502 carry out a number of operations. A first operation may read the strike sector 102 (e.g., as identified by the sector ID 604) from the training file 600. A second operation may determine a specified indication in the training file 600, for example illuminating a lighting element 204 of the strike indicator 104. In one or more embodiments, where a certain indication may require a certain audio file, video file, and/or augment file, an indicator query routine 514 may be called. The indicator query routine 514 may comprise computer readable instructions that when executed read an appropriate file (e.g., an augment image 615) from memory to provide the indication.

In one or more embodiments, the user may be expected to strike immediately following indication and/or illumination, or may be instructed to wait for additional indications depending on the mode selected in the initiation routine 510. If additional indications prior to strike are not indicated, a third operation may receive the strike input 108 of the strike to generate the strike data 640 from: (i) a strike signal 111 generated by the strike detector 110, (ii) a strike signal 711 generated by the strike detector 710, (iii) other sensors (e.g., the accelerometer 211), and/or (iv) additional data from the control unit 500 (e.g., the time 655 of impact from a clock of the control unit 500). A performance recording routine 516 may comprise computer readable instruction that when executed record the strike data 640 in a performance file 625. In one or more embodiments, similar processes may be carried out for positioning on the mat 150 and/or one or more extremity devices 700. In one or more embodiments and the embodiment of FIG. 5, communicatively coupling between the control unit 500 and the mat 150 is illustrated, where the mat 150 is shown comprising a set of position sectors 152, each including a position indicator 154 capable of providing a position indication 156 and a position detector 160 capable of receive a position input 158 to generate a position signal 161 which may in turn be utilized to generate a position data 630. Similarly, the control unit 500 may be communicatively coupled to one or more extremity devices 700 (shown as the extremity device 700A and the extremity device 700B in the embodiment of FIG. 5). The position indictor 154 may be activated by transmitting an indicator signal 162. The control unit 500 may receive a strike signal 711 generated from a strike input 708 on a strike detector 710, as further shown and described in conjunction with the embodiment of FIG. 7.

During recording in the performance file 625 and/or after termination of the training execution routine 512, the user's performance may be determined. In one or more embodiments, a performance assessment engine 580 comprises computer readable instructions that when executed may compare the performance file 625 to the training file 600 (and/or other performance metrics) to measure, score, and/or otherwise determine the performance of the user. Performance metrics may be stored in an assessment data 660. An example of the training file 600, the performance file 625, and the assessment data 660 are illustrated in FIG. 6, and an example of execution of the training file 600 by the training execution routine 512 is shown and described in conjunction with the embodiment of FIG. 10.

Finally, FIG. 5 illustrates a communicatively coupling to a machine learning server 570. According to one or more embodiments, the machine learning server 570 stores an artificial neural network that may be trained to recognize and/or predict the difficulty of various patterns of position and/or strike inputs. A machine learning process may then be used to provide an "artificial intelligence" for increasing or decreasing training, workout, and/or challenge difficulty. The artificial neural network may also be used to randomly generate sequences that can provide a challenge in training, fitness, and/or a workout and that can incrementally and/or sufficiently push the user's personal performance limits. An example machine learning process is shown and described in conjunction with the embodiment of FIG. 11.

Figure 6:
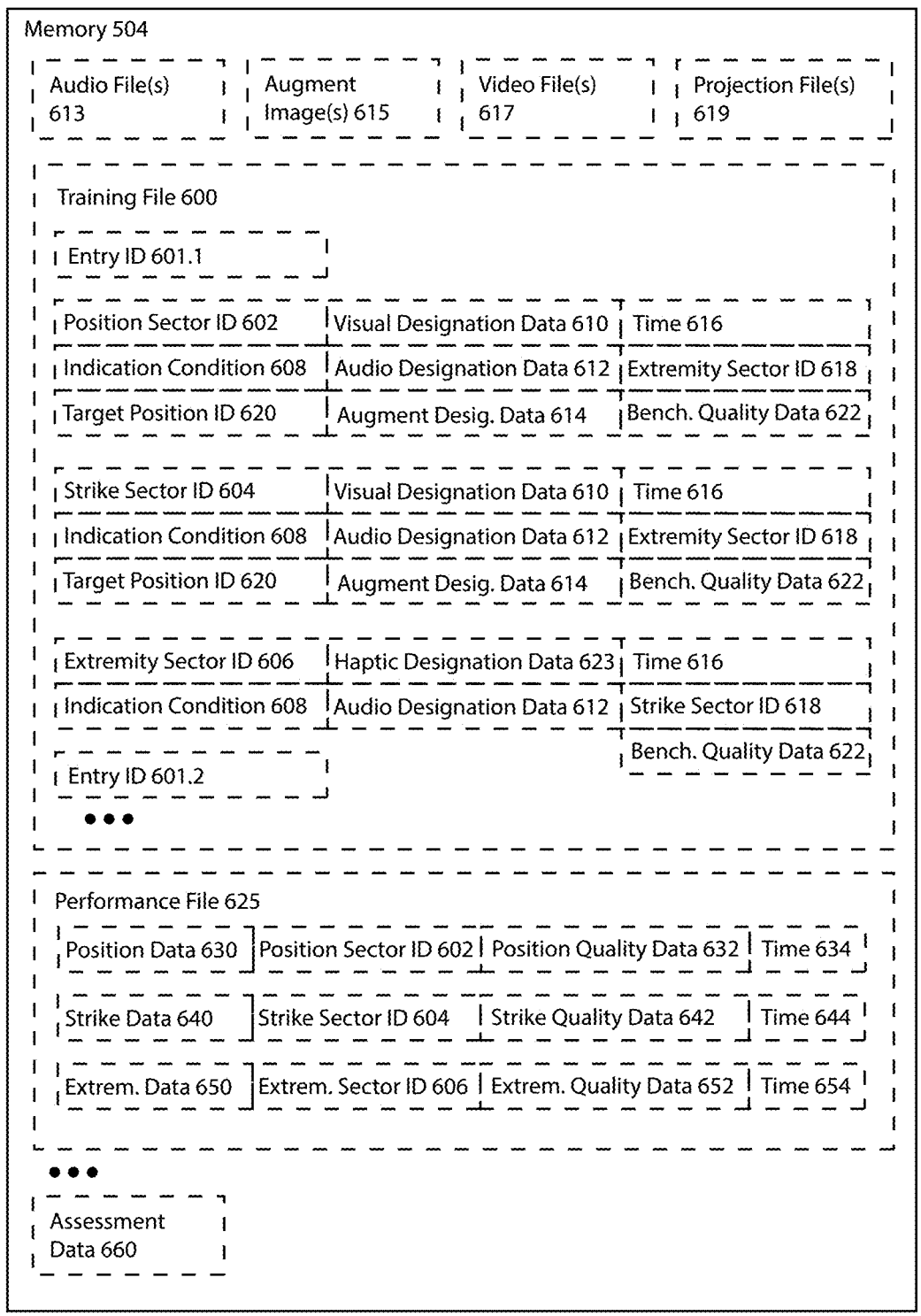
FIG. 6 illustrates an example training file for providing a training, workout, and/or fitness routine, the training file comprising one or more entries specifying indication of a position sector, a strike sector, and/or an extremity sector, and further illustrates a performance file for recording a performance of the user for later comparison to the training file to provide a performance assessment, according to one or more embodiments.

FIG. 6 illustrates a computer memory (e.g., the memory 504) storing an example of the training file 600 and the performance file 625, according to one or more embodiments. A training file 600 may comprise one or more entries store data defining an entry ID 601 (e.g., shown as the entry ID 601.1 for the first entry, the entry ID 601.2 for the second entry, etc.). The entry ID 601 may be an identifier of the entry, and in one or more embodiments, may be a sequential number (e.g., in such case that two or more entries occur in the training file 600).

With respect to a positioning on the mat 150, the entry may include associated attributes comprising a sector ID (e.g., a position sector ID 602), a visual designation data 610, an audio designation data 612, and/or a time 616. The visual designation data 610 may also include an augment designation data 614, and the position may further include a specified extremity via the extremity ID 618 and/or extremity sector ID 606. A target position ID 620 may identify a position to which the strike target 100 should move before, during, and/or after the position indication 156 of the entry and/or the collection of the position input 158 associated with the entry.

With respect to a strike to be applied to the strike target 100, the entry may include associated attributes comprising a sector ID (e.g., the strike sector ID 604), a visual designation data 610, an audio designation data 612, and/or a time 616. The visual designation data 610 may also include an augment designation data 614, and the position may further include a specified extremity to achieve positioning via the extremity ID 618. A position time 616 may measuring an elapse time from at least one of initiation of the performance file 625, indication of the position sector 152, generation of a different position data 630, indication of the strike sector 102, and/or generation of a different strike data 640. In such case, the strike target 100 is capable of controlled motion, a target position ID 620 may identify a position to which the strike target 100 should move before, during, and/or after the strike indication 106 of the entry and/or the collection of the position input 158 associated with the entry.

With respect to a strike to be applied using the extremity device 700, the entry may include associated attributes comprising a sector ID (e.g., the extremity sector ID 606), an audio designation data 612, a haptic designation data 623, and/or a time 616. The strike sector 102 for the extremity to achieve the positioning may further be specified via the strike sector ID 602. A target position ID 620 may identify a position to which the strike target 100 should move before, during, and/or after the strike indication 706 of the entry and/or the collection of the strike input 708 associated with the entry.

The visual designation data 610 may include data specifying whether the strike indicator 104 should be activated (e.g., illuminated, an AR image overlaid, an image projected) to provide the user with the visual indication. The visual designation data 610 may also include data about a quality of the visual indication, for example an intensity of illumination, a color of illumination, a duration of illumination, etc., for example to help in describing the proper foot placement 302 as shown and described in conjunction with the embodiment of FIG. 3. The audio designation data 612 may include data specifying whether the control unit 500 should generate the sector callout 109, for example generating audio specifying a strike sector 102. The time 616 may include a timing for: (i) providing the position indication 156, (ii) receiving the position input 158, (iii) providing the strike indication 106, (iv) receiving the strike input 108, (v) providing the strike indication 706, and/or (vi) receiving the strike input 708 (e.g., such that a time for measuring a response of the user can be measured and/or assessed). The time 616 may be a time relative to any reference, e.g., initiation of the training file 600, the receipt of the strike input 108 and/or the position input 158, etc.

In the embodiment of FIG. 6, several media file types are also shown. One or more audio files 613 may be used be data that can be called to provide audio for indication (e.g., the sector callout 109) and/or other purposes (e.g., feedback sound effects related to performance). The one or more audio files 613 may also be used to provide training and/or instruction. One or more augment images 615 may be image files (including static and dynamic images and/or animations viewable in virtual and/or augmented reality) usable for indication and/or providing feedback. One or more video files 617 may be used for instruction. Video and/or audio instructions for each entry, although not shown in the embodiment of FIG. 6, may be periodically triggered. One or more projection files 619 may be used to project indicators and/or provide feedback, for example as shown and described in conjunction with the embodiment of FIG. 12.

In one or more embodiments, data generated during execution of the training file 600 may be stored, for example in a performance file 625. The performance file 625 may include one or more instances of the position data 630, the strike data 640, and/or the extremity data 650. In one or more embodiments, there may be one instance of the position data 630, the strike data 640, and/or the extremity data 650 for each entry of the training file 600 (e.g., an entry specifying a position sector ID 602 may have a corresponding set of position data 630). The position data 630 may include a position sector ID 602 of the position sector 152 on which the user was positioned and/or a position quality data 632 (e.g., a force or pressure of the foot placement 302, whether the sector positioned matches the position sector ID 602 that was actually indicated, etc.). The time 634 may also be included in the position data 630 and may correspond to the time of the position input 158. Similarly, the strike data 640 may include a strike sector ID 604 of the position sector 152 that the user struck and a strike quality data 642 (e.g., a force or pressure of the strike, a matching accelerometer data, whether the sector struck matches the strike sector ID 604 and/or the extremity ID 618 as indicated, etc.). The time 644 may also be included in the strike data 640 and may correspond to the time in which the strike input 108 was made. Similarly, the extremity data 650 may provide an extremity sector ID 606, an extremity quality data 652, and a time 654. Additional data can be stored in the user performance file 625, as may be shown and described throughout the present embodiments.

In one or more embodiments, a performance of the user may be assessed on a per-positioning and/or per-strike basis. The performance may also be assessed on a per-training file 600 basis, or across many training files 600. In one or more embodiments, performance may be evaluated based on whether input was provided to the correct strike sector 102, position sector 152, and/or with the correct extremity (and/or even in the correct "sector" of an extremity, as shown and described in conjunction with the embodiment of FIG. 4). In one or more embodiments, performance may also be measured based on reaction time (e.g., time from indication to strike), an accuracy (e.g., an ability to hit the center of a strike sector 102 and/or stand solely on designated position sectors 152), a cadence (e.g., ability to consistently find positionings and apply strikes), a force (e.g., ability to apply strong strikes), and many other measurements and metrics. Any analysis or performance metrics may be stored in an assessment data 660. The assessment data 660 for example, may include the score of the user, differences in timing, or other calculated aspects of the performance of the user based on data recorded in the performance file 625. The assessment data 660 may be stored and/or presented to the user.

Figure 7:
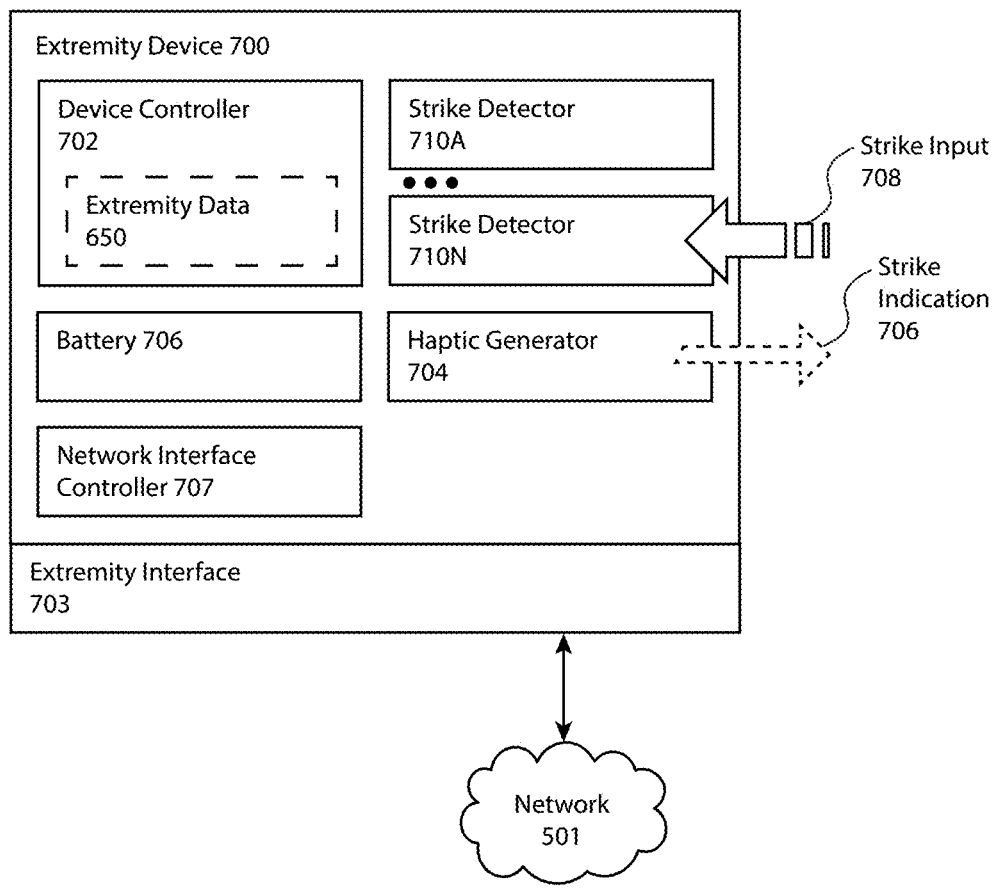
FIG. 7 illustrates an extremity device that can be attached to an extremity of the user (e.g., a hand, an arm, a foot, a leg), including a haptic generator for providing a strike indicator and one or more strike detectors for generating a strike signal, for example positioned according to the positions of the beacons illustrated in FIG. 2A and FIG. 2B, according to one or more embodiments.

FIG. 7 illustrates an extremity device 700, according to one or more embodiments. The extremity device 700 is a device that is fitted to a human extremity and generates additional instructive capability and/or useful data for the user, while also possibly providing some impact cushioning or additional elements of comfort during combat training. The extremity device 700, for example, may be configured as a glove, an elbow pad, a knee pad, a sock, and/or a shoe. Two or more types of extremity devices 700 may be utilized with the strike target 100, the mat 150, and/or the manikin 200.

The extremity device 700 includes a device controller 702 (that may include a computer processor and/or a computer memory). The extremity device 700 may have a device ID (not shown, but which may be designated through use of an extremity ID 618 as shown and described in the embodiment of FIG. 6) that may be used to track which instance of the extremity device 700 applied a given instance of the strike input 708. The device controller 702 stores and/or transmits a strike signal 711 and/or extremity data 650 (and/or a strike signal 711, not shown) to the control unit 500 via a network interface controller 707 over the network 501. The extremity device 700 includes one or more strike detectors 710, the strike detector 710A through the strike detector 710N. For example, for an extremity device 700 configured as a sock, there may be a first strike detector 710A where the ball of the foot would provide the strike input 708 (e.g., in a location of the beacon 452D of FIG. 4B), a second strike detector 710B where the heel of the foot would provide the strike input 708 (e.g., in a location of the beacon 452E of FIG. 4B), and a third strike detector 710C in the approximate location of the instep of the foot (e.g., in a location of the beacon 452B of FIG. 4B). The strike detector 710 may utilize similar technologies to the strike detector 110 and/or the position detector 160. The strike detector 710 may generate extremity data 650, which can be communicated to the control unit 500, including but not limited to for storage in the performance file 625.

In one or more embodiments, the user may also be provided with signals indicating which extremity is to perform the strike on the strike target 100 and/or be placed at a position of the mat 150. For example, the haptic generator 704 may be substantially simultaneously activated (e.g., causing a vibration) on an extremity device 700A (e.g., on a right hand of the user) at the same time the visual strike indicator 104A is activated to indicate that the user should utilize their right fist to apply the extremity strike to a specific strike sector 102. The haptic generator 704 and/or one or more other indicators associated with the extremity device 700 may be triggered by the indicator signal 712.

The training file 600 of FIG. 6 may include additional entries for specifying strikes and/or placements with the extremity device 700. For example, the entry corresponding to an entry ID 601 may include an extremity ID 618 and/or an extremity sector ID 602, a visual designation of the correct extremity, and/or an audio designation of the correct extremity (e.g., the audio designation data 612). The training execution routine 512 may therefore be able to indicate to the user which extremity to use for extremity strikes according to a timing that is before, during, between, and/or after each extremity strike. Similarly, the performance file 625 may include extremity data 650 and/or additional data specifying the extremity sector ID 606 and/or extremity ID 606 of an extremity device 700 that provided the strike input 708, an extremity strike quality data 652 (e.g., pressure generated near toes of the foot versus heel of the foot), and the time 654 of the extremity strike as provided by the extremity device 700.

The extremity interface 703 is a physical interface to couple the extremity device 700 to an extremity of the user. For example, the extremity interface 703 may be the form-fitting interior of a glove, sock, or shoe (e.g., the extremity device 700 may be in a form similar to the article 400 and/or the article 450 of FIG. 4). The extremity interface 703 may also be implemented, for example, with hook-and-loop straps for elbow pads or other attachment elements intended to affix or connect the extremity device 700 to the extremity.

In one or more embodiments, the extremity device 700 may provide strike and/or positioning signal generation, while the strike target 100 and/or the mat 150 are comprised of sensing beacons (e.g., similar to the sensing beacon 402 and/or the beacon 452 of FIG. 4A and FIG. 4B).

Figure 8:
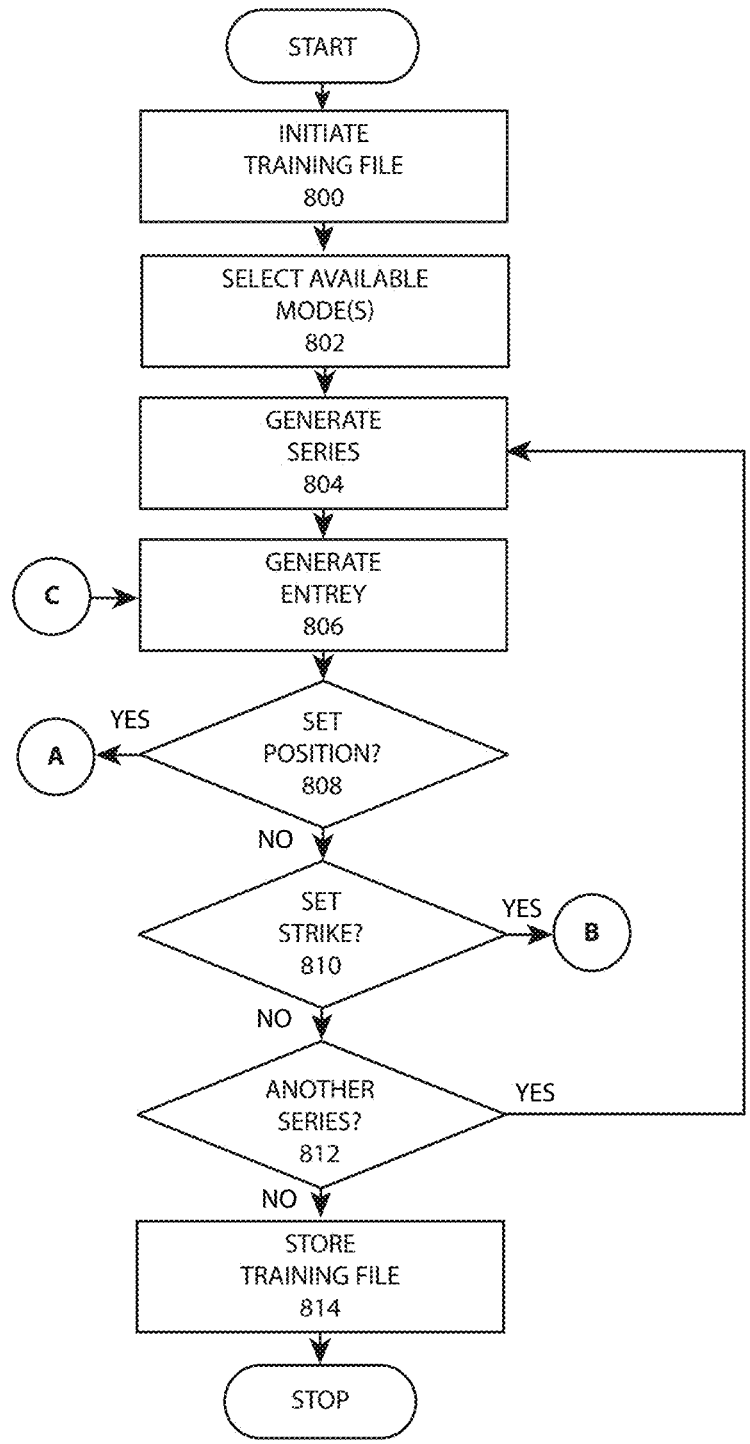
FIG. 8 illustrates a training file setup process flow, according to one or more embodiments.

FIG. 8 illustrates a training file setup process flow 850, according to one or more embodiments. Operation 800 initiates a training file 600, for example as a data object within the memory 504. The training file 600 may also be separately defined outside the memory 504 and available for download, for example from a remote server and/or the device 560 (e.g., a smartphone). Operation 802 selects one or more available modes in which the training file 600 can be executed. For example, in a first mode, each of twenty entries of a training file 600 (e.g., identified by the entry ID 601.1 through an entry ID 601.20) may be indicated (e.g., which may include twenty positions and twenty corresponding strikes). Following completion of the indication, the user may then have to apply the position input 158 and/or the strike input 108. In another mode, each entry of the training file 600 may first indicated, then the inputs provided. In another mode, each entry is executed, with a limited time available to provide the strike input 108 and/or position input 158. In yet another mode, the order of each entry may be executed at random. In still yet another mode, grouping of one or more entries referred to as a "series" may be specified for one or more modes of presentation, for example where each of the positions and/or strikes of a series is indicated prior to the user applying the strike input 108 and/or the position input 158. Alternatively, each series may be executed sequentially but each entry of the series executed at random.

Operation 804 may define a beginning of a series. The series may be designated with an identifier, similar to the entry ID 601. Operation 806 may generate an entry, including generation of an entry ID 601. Operation 808 determines whether to set a positioning, e.g., whether the entry will have a position sector 152 with which the user must interact and/or a position indication 156. Where a positioning is to be defined, operation 808 proceeds to the process flow of FIG. 9 along path circle 'A'. Otherwise, operation 808 proceeds to operation 810. Operation 810 determines whether to set a strike, e.g., a strike sector 102 in which the user must interact and/or a strike indication 106, in which case operation 810 proceeds to the process flow of FIG. 9 along path circle 'B'. Following the defining of a positioning and/or a strike, the process flow of FIG. 9 returns to the process flow of FIG. 8 at operation 806 along path circle 'C', as further described below. In one or more embodiments, several loops from operation 808 to operation 806 and/or from operation 810 to operation 806 may be completed to build up two or more positionings and/or strikes within the entry.

In the event no additional strikes are to be defined in operation 810, operation 810 proceeds to operation 812 which determined whether an addition a series is to be defined. If an additional series is to be defined, operation 812 returns to operation 804. Otherwise, operation 812 proceeds to operation 814 which stores the training file 600, e.g., in the memory 504 and/or in a different machine readable medium location such as a computer storage (e.g., a solid state drive, a hard disk).

Figure 9:
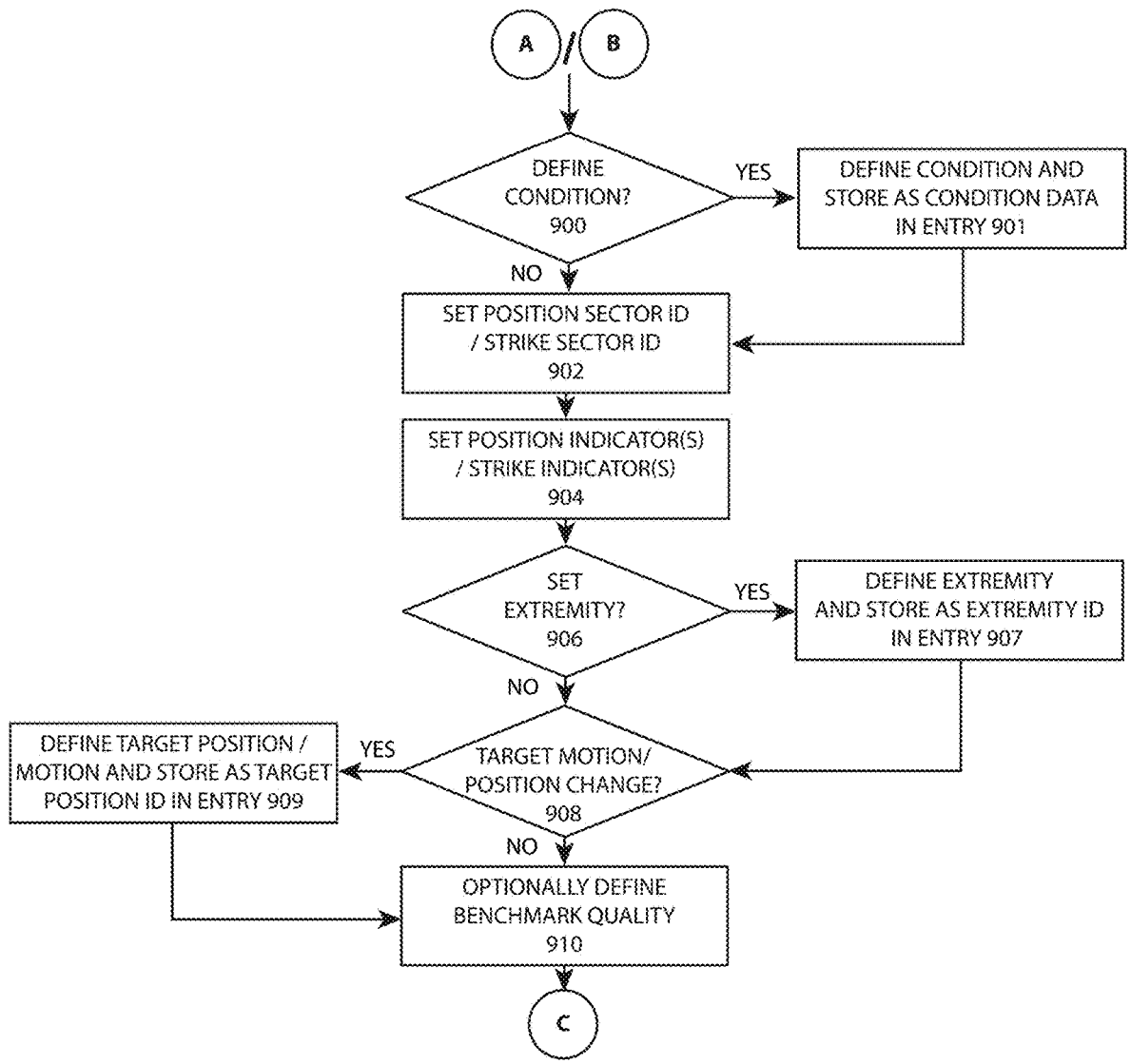
FIG. 9 illustrates a continuation of the training file setup process flow of FIG. 8 for defining a position sector and/or a strike sector of an entry of the training file, according to one or more embodiments.

FIG. 9 illustrates a training file setup process flow 950 illustrating the defining of a positioning (e.g., on the mat 150) and/or a strike (e.g., on the strike target 100) within an entry of the training file 600, according to one or more embodiments. In the embodiment of FIG. 9, the path circle 'A' indicates an incoming path for defining a positioning, whereas the path circle 13' indicates an incoming path for defining a strike. Operation 900 determines whether to set a condition that must occur before indicating the position and/or the strike, as applicable (e.g., the indication condition 608 of FIG. 6). If a condition is to be defined, operation 900 proceeds to operation 901, which defines the condition and stores the condition as the indication condition 608 in the entry. For example, the condition may be that the strike is only indicated (and the strike input 108 only collected) if the user achieved adequate performance on a previous strike input 108. If no condition is to be defined in operation 900, then operation 900 proceeds to operation 902.

Operation 902, with respect to a positioning, sets a position sector ID 602, and, with respect to a strike, sets a strike sector ID 604. For example, in the embodiment of FIG. 1 a position sector may be specified as 'A1' for the upper most left hand position on the mat 150, although the position ID may also be a computer readable form, for example a 32-character identifier of the position detector 160 located at human-readable position 'A-1'. Additional forms of address may also be used as the position sector ID 602 and/or the strike sector ID 604.

Operation 904, with respect to the positioning, sets one or more position indicator(s) 154 to provide the position indication 156, and, with respect to the strike, to provide one or more strike indicator(s) 104 to provide the strike indication 106. For example, both a visual and audio indicator may be specified (e.g., illumination of a lighting element 204 and a sector callout 109). For projection and/or augmented reality, operation 904 may reference one or more files utilized in the projection and/or augmentation. For example, one or more augment images from the set of augment image(s) 615 may be specified. Operation 906 determines whether a particular extremity should be defined as associated with the positioning and/or the strike. For example, it may be intended that a left foot is to provide the position input 158 at the position sector 152 that may have been identified by the position sector ID 602 defined in operation 902. In another example, it may be determined that a right foot, and more particularly a heel of the right foot, is to provide the strike input 108 that may have been identified by the strike sector ID 604 defined in operation 902. If an extremity and/or section of an extremity is to be defined, operation 906 proceeds to operation 907 which defines an extremity by storing an extremity ID 618 and/or extremity sector ID 606 in association with the position sector ID 602 and/or the strike sector ID 604, as applicable. Otherwise, operation 906 proceeds to operation 908.

Operation 908 operationally determines a target motion and/or position of the strike target 100 (in the event that the strike target 100 is capable of controlled motion). For example, the target position may be able to rotate, move back and forth/in and out (e.g., laterally), and/or move up and down (e.g., move vertically). If the strike target 100 is to have imparted motion and/or a changing position, operation 908 proceeds to operation 909 which defines a target potion and/or a target motion and stores the designation as a target position ID 620 in the entry. For example, the target position ID 620 may call an application programming interface (API) controlling the motor 215 capable for rotating the manikin 200, as shown and described in conjunction with the embodiment of FIG. 2, and/or an API for controlling hydraulic cylinders, pistons, and/or actuators (e.g., the actuator 217) that can impart sudden and/or gradual lateral and/or vertical motion to the manikin 200. In one or more other embodiment, the target position ID 620 may reference an index of motions stored in computer memory, for example shaking, sudden jolts, steady rotation, random motion, etc. Operation 910 may optionally define a benchmark quality of the positioning and/or the strike, as applicable, e.g., by storing a benchmark quality data 622 (abbreviated the "bench. quality data 622" in the accompanying figures. For example, the benchmark quality data 622 may specify the relative distribution of pressure on one or more position detectors 160, the force and/or pressure to be applied to a strike detector 110, a speed to be achieved relative to a positioning and/or strike of a previous entry of the training file 600, etc. Operation 910 then may return along path circle 'C' to operation 806 of FIG. 8.

It should be noted that the process flows of FIG. 8 and FIG. 9 illustrate one or many processes to set up the training file 600, and multiple adjustments and/or modifications may be made while remaining within the scope of the present embodiments. For example, while FIG. 9 may focus primarily on creating entries having a position sector ID 602 and a strike sector ID 604 as shown in the embodiment of FIG. 6). One or more additional operations may be added for specifying an extremity sector ID 606 (as shown in FIG. 6). Additionally, different arrangements of entries, and an arbitrary grouping of series, sub-series, etc. may be possible. As just another example, series and/or entries may also have assigned conditions before their execution. Many other processes may be available to define the training file 600, and likewise many additional data structures than those shown in FIG. 6 may be used to define positionings of the mat 150 and/or strikes on the strike target 100, according to one or more embodiments.

Figure 10:
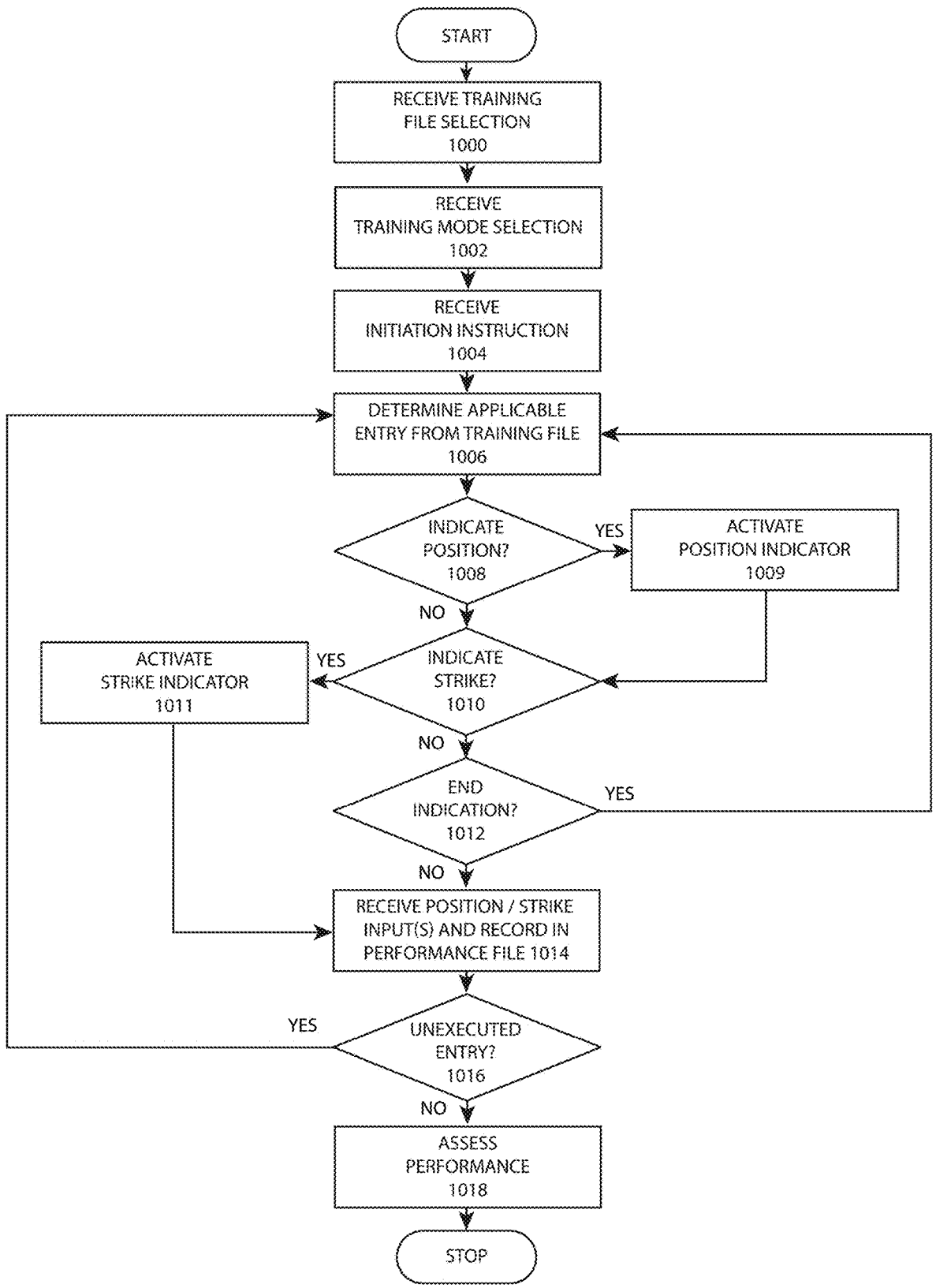
FIG. 10 illustrates a training program process flow illustrating execution of the training file, according to one or more embodiments.

FIG. 10 is an example training execution process flow 1050, according to one or more embodiments. Operation 1000 receives a selection of a training file 600. The training file 600 may be selected, for example, through a voice interface, through a companion mobile application communicatively coupled to the control until 500 (e.g., on the device 560) and/or other methods. Operation 1002 receives a training mode selection, for example the training mode specified in operation 802 of FIG. 8. Operation 1004 receives an initiation instruction, for example to begin execution of the training file 600. In one or more embodiments, the training file 600 may be prepared to execute but await a 'ready' signal from the user, for example the user pressing a button, instructing the execution to begin through a voice interface, stepping onto the mat 150 (e.g., generating a position signal 161 from any position detector 160), etc.

Operation 1006 determines an applicable entry of the training file 600 to read and execute. Depending on the mode, this may be determined in order, at random, and/or based on one or more conditions. Operation 1008 determines whether a positioning is specified for the user, and, in such case a positioning is specified, operation 1008 proceeds to operation 1009. Positioning for the user may be specified, for example, where the training file 600 includes a position sector ID 602 and associated data. Operation 1009 may then activate the position indicator 154, for example a visual indication (e.g., illumination of a lighting element 304, a projected position indicator 1354, an augment image overlaid on a position sector 152, etc.) and/or an audible indication (e.g., the sector callout 109).

Operation 1010 determines whether a strike is specified for the user. In such case, operation 1010 proceeds to operation 1011 which activates the strike indication 106, for example a visual indication (e.g., illumination of a lighting element 204, a projected strike indicator 1304, an augment image overlaid on a position sector 152, etc.) and/or an audible indication (e.g., the sector callout 109). Operation 1011 may then proceed to operation 1012, which determines if another indication of an entry should be provided prior to receiving the position input 158 and/or the strike input 108. If an additional indication is to be provided prior to receiving inputs, operation 1012 returns to operation 1006. For example, operation 1006 through operation 1012 may loop until each indication within the sequence is provided (according to one or more modes of operation selected by the user). If no additional indications are to be provided, operation 1012 proceeds to operation 1014.

Operation 1014 receives the position input 158 and/or the strike input 108 indicated in operation 1009 and/or operation 1011. Operation 1014 may receive one or more signals (e.g., the strike signal 111 generated by the strike detector 110 and/or the position signal 161 generated by the position detector 160) and store the signals and associated data as the position data 630 and/or the strike data 640, according to one or more embodiments. The position data 630 may include a position sector ID 602 of one or more positions sectors 152 with which the user actually makes contact with his or her extremity (including a "miss"), the position quality data 632, and the time 634 (e.g., a timestamp, an elapse time from a different event, position, and/or strike). Similarly, the strike data 640 may include a strike sector ID 604 of one or more strike sectors 102 with which the user actually makes contact with his or her extremity, the strike quality data 642, and the time 644. Upon one of the following, operation 1014 may proceed to operation 1016: (i) receipt of the correct input, (ii) receipt of the incorrect input, and/or (iii) expiration of a timer from the last provided indication. Operation 1016 determines whether another entry remains for execution. If an unexecuted entry remains, operation 1016 returns to operation 1006. Otherwise, operation 1016 proceeds to operation 1018.

Operation 1018 may assess the performance of the user. The assessment may be based on a number of methods, including without limitation data collected during the execution of the training file 600 generated by or on conjunction with the user's interaction with the strike target 100, the mat 150, the article 400 and/or the article 450, and/or the extremity device 700. For example, with respect to a positioning, the position quality data 632 and the time 634 may be compared with the benchmark quality data 622 and the time 616 associated with a position sector ID 602 within an entry. With respect to a strike, the strike quality data 642 and the time 644 may be compared with the time 616 associated with a strike sector ID 604 within an entry. In a few specific examples: the user may receive a score based on how hard and fast they struck the strike target 100; the user may be scored on their reaction time; the user may be scored based on comparison to an average score of other users for which data is available; and/or the user may be scored based on how closely they can match the timing of the strike indication 106 and/or the position indication 156. The assessment may lead to display of celebratory and/or congratulatory sounds or images, and/or feedback or instructional material describing what the user did well or in which areas they may need improvement. In one or more embodiments, assessment may also be provided in real time while the user applies the strike input 108 and/or the position input 158, including indicating how well the user is doing through augment images (e.g., making an overlay image on the manikin 200 appear more beat-up if the user is performing well).

Figure 11:
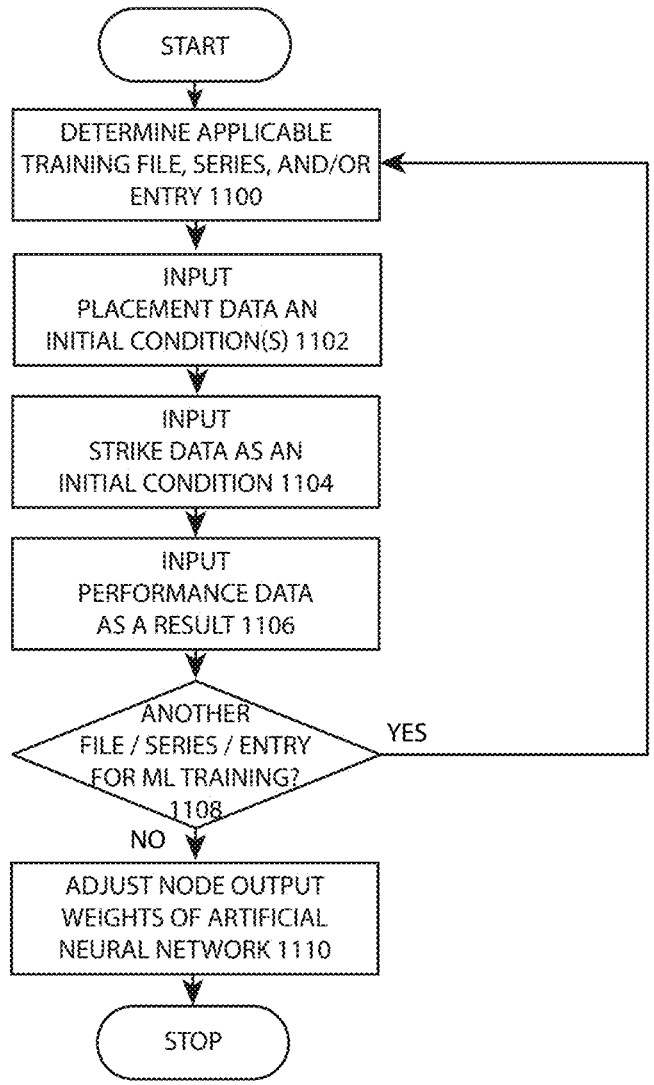
FIG. 11 illustrates a machine learning difficulty adjustment process flow, according to one or more embodiments.

FIG. 11 illustrates a machine learning difficult adjustment process flow 1150, according to one or more embodiments. Briefly referring to FIG. 1 as an example, the mat 150 and the strike target 100 includes a number of discrete sectors (e.g., the position sector 152, the strike sector 102) which may provide an input dataset for a machine learning algorithm. The machine learning algorithm may include an artificial neural network. The artificial neural network may include two or more nodes each having a function processing inputs to generate weighted outputs, each node: receiving input from outside the artificial neural network, receiving a weighted output from another node as an input, passing a weighted output to another node, and/or passing an output outside of the artificial neural network. The artificial neural network may be capable of learning patterns and associated outcomes, and then receiving patterns and predicting outcomes. In one or more embodiment, patterns of positioning and/or strikes from the training file 600 and/or the performance file 625 may be used to train the artificial neural network to recognize the difficulty. The trained artificial neural network may then be utilized to determine the difficulty of new training files 600, adjust the difficulty of new training files 600 to allow for steady progress of the user, and/or to fix training files 600 that may occasionally present impossible or nearly impossible patterns, specially when randomly and/or procedurally generated. The artificial neural network may also be utilized to generate new random patterns that may be especially challenging to experts while still remaining feasible for the human body. Training the neural network may be accomplished through one or more methods known in the art of machine learning and computer programming, for example back propagation of errors (e.g., "backprop."). The embodiment of FIG. 11 provides one example of using a machine learning algorithm to train an artificial neural network.

Operation 1100 determines an applicable training file 600, series of the training file 600, and/or entry of the training file 600, and one or more associated instances of a performance file 625. For example, the artificial neural network may be trained to assess the difficulty of any five consecutive entries in the training file 600, to assess the difficulty of a given pair of one positioning and one striking, and/or to assess the entire training file 600. Operation 1102 inputs positioning data (e.g., data associated with the position sector ID 602) as one or more initial conditions(s) as inputs into the input nodes, for example as extracted from the training file 600. Operation 1104 may similarly input strike data (e.g., data associated with the strike sector ID 604) as one or more initial condition(s), as also may be extracted from the training file 600. Operation 1106 inputs a set of performance data (e.g., the position quality data 632 and/or the strike quality data 642) as a result associated with the entity. Performance data measuring absolute metrics (e.g., without regard to benchmarks such as the benchmark quality data 622) may be especially useful, for example based on reaction time, accuracy of providing the strike input 108 and/or the position input 158, etc. In one or more embodiments, the artificial neural network may therefore "learn" to "recognize" an easy or difficult sequence. This process may be no unlike teaching an artificial neural network to associate a word with shapes or objects within an image file as such image recognition is known in the art. Operation 1108 determines whether another training file 600, entry (and/or the associated performance file 625 exists for training the artificial neural network. If there is an additional training to be utilized, operation 1108 returns to operation 1100. If not, operation 1108 proceeds to operation 1110. Operation 1110 the adjusts an output weight of one or more nodes of the artificial neural network to train the artificial neural network. Training may be repeated over time, including collection from various users at various challenge levels. In one or more embodiments, the training of the artificial neural network may include recognizing performance and/or difficulty based on characteristics of users, such as height, weight, age, gender, and other characteristics.

Once the artificial neural network has been trained to recognize performance (and therefore, by extension, difficulty), the artificial neural network may be used to predict the difficulty of an arbitrary sequence of positionings and/or strikes within the scope of the training. In addition, the inputs may be "locked" and the artificial neural network may output proposed positionings and/or strikes which may be of wholly new design. Outputs may be used to set the benchmark quality data 622 of a training file 600, and/or to define new training files 600, and for other purposes to enhance use of the strike target 100, the mat 150, and/or the extremity device 700.

Figure 12:
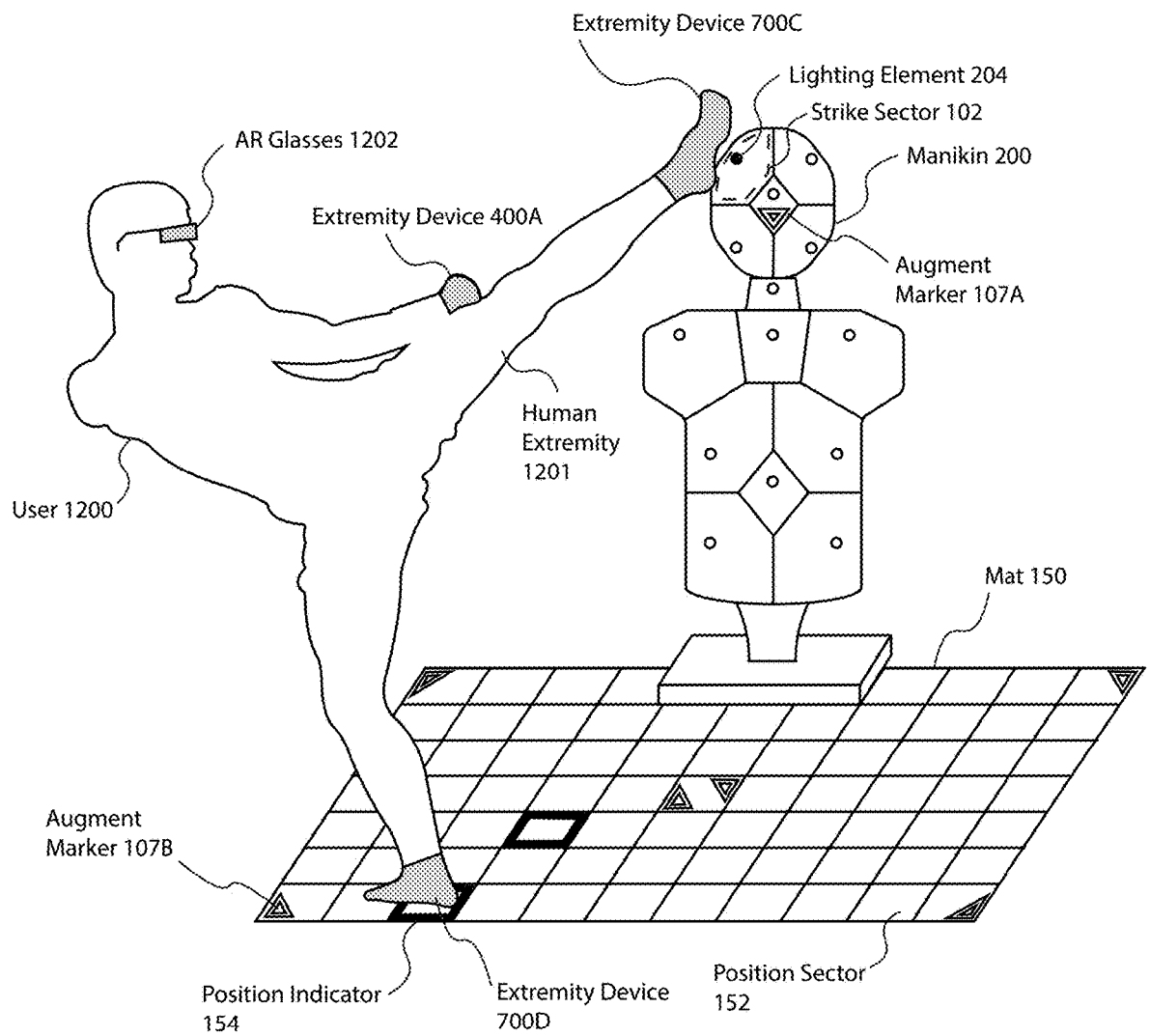
FIG. 12 illustrates an augmented reality system in which the position indicator and/or the strike indicator is provided through overlay of an augment image viewed by the user through a set of augmented reality glasses, according to one or more embodiments.

FIG. 12 illustrates an augmented reality system 1250, according to one or more embodiments. In the embodiment of FIG. 5, an example is provided in which a user, referred to as the user 1200, utilizes an instance of the manikin 200, an instance of the mat 150, and four instances of the extremity device 700 (e.g., a right glove as extremity device 700A, a left glove as extremity device 700B (not shown), a left foot as extremity device 700C, and a right foot as extremity device 700D). The user 1200 also utilizes a pair of augmented reality glasses, shown as the AR glasses 1202. The extremity device 700D includes the arrangement of strike sectors 102 as shown in the embodiment of FIG. 2, including the augmented reality marker (e.g., the augment marker 107A). In addition, several additional augment markers 107 are illustrated on the mat 150, for example to help provide augment image positioning (one of such augment markers is labeled, the augment marker 107B).

The user 1201 may select training file 600, which may, for example, be based on a specific martial art. The training file 600 may involve groups of indicated extremity strikes, each with a distinct foot position before, during, and/or after the strike in the area around the manikin 200. For example, the training file 600 may store data specifying illumination of four strike indicators 104: a first visual instance of the strike indicator 104A in the head 201, a second visual instance of the strike indicator 104B in the torso 203, and two simultaneous strike indicators 104C and 104D in the neck 209 and the again in the head 201, respectively. Upon activation of each visual instance of the strike indicator 104, the user 1200 may also be provided with one or two indications of foot placement using the position indicators 154 of position sectors 152. The user 1200 may also be provided with signals indicating which extremity (e.g., the human extremity 1204) with which to perform the strike. For example, the haptic generator 704 may be substantially simultaneously activated (e.g., causing a vibration) on the extremity device 700A at the same time the visual instance of the strike indicator 104 is activated to communicate to the user 1200 that the user 1200 is to utilize their right fist to perform the first extremity strike. In one or more embodiments, the human extremity 1204 to be used in the strike may also be provided in the sector callout 109. The user 1200 may then carry out the extremity strikes to generate and record the performance file 625, as may be stored in the memory 504 of the control unit 500.

The user 1200 may also utilize AR glasses 1202. AR glasses 1202 may include, for example: Everysight Raptor, Google Glass Enterprise Edition, Kopin SOLOS Meta 2, ODG, R-7, Toshiba dynaEdge AR100 Viewer, Vuzix Blade Smart Glasses, ThirdEye Gen X1. The AR glasses 1202 may be communicatively coupled to the control unit 500 which may coordinate the augment image display (e.g., through querying and displaying augment images that may be queried through the indicator query routine 514 to the augment image(s) 615). The AR glasses 1202 may require support of an additional computing device for processing graphics, according to one or more embodiments, which also may be communicatively coupled and coordinated by the control unit 500. The training file 600 may include reference to AR graphics (e.g., as such graphics may be store in the augment image(s) 615) to project on or associated with the manikin 200 and/or on or associated with the position sector 152. In one or more other embodiments, the augment images may be used to provide the visual instance if the strike indications 106 and/or the position indication 156. In one or more embodiments, an AR image may include a face intended to be an instructor and/or a sparring adversary projected on the head 201. In one or more other embodiments, additional cloths, extremities, body parts, and other graphics may be projected on the strike target 100 and/or the manikin 200. The augment marker 107A and/or the augment marker 107B may be used to locate, orient, and/or position the graphics. In one or more embodiments the graphics may be AR animations.

Either in real time or after completion of execution of the training file 600, the user performance file 625 can be assessed to determine the user 1200's accuracy, timing, pressure and/or force, positioning on the mat 150, correct striking position on an extremity device 700, and/or additional quantifiable or measurable aspects of the combat training, combat-based workout, and/or fitness training. The user 1200 can be provided with a score, for example compared to a reference within the training file 600 (e.g., the benchmark quality data 622). The score may be communicated, for example, through lighting of a number of visual instances of the strike indicator 104 and/or the position indicator 154, announcement using the speaker 520, presentation as an image on the display screen 522, and/or presentation through the AR glasses 1202.

Figure 13:
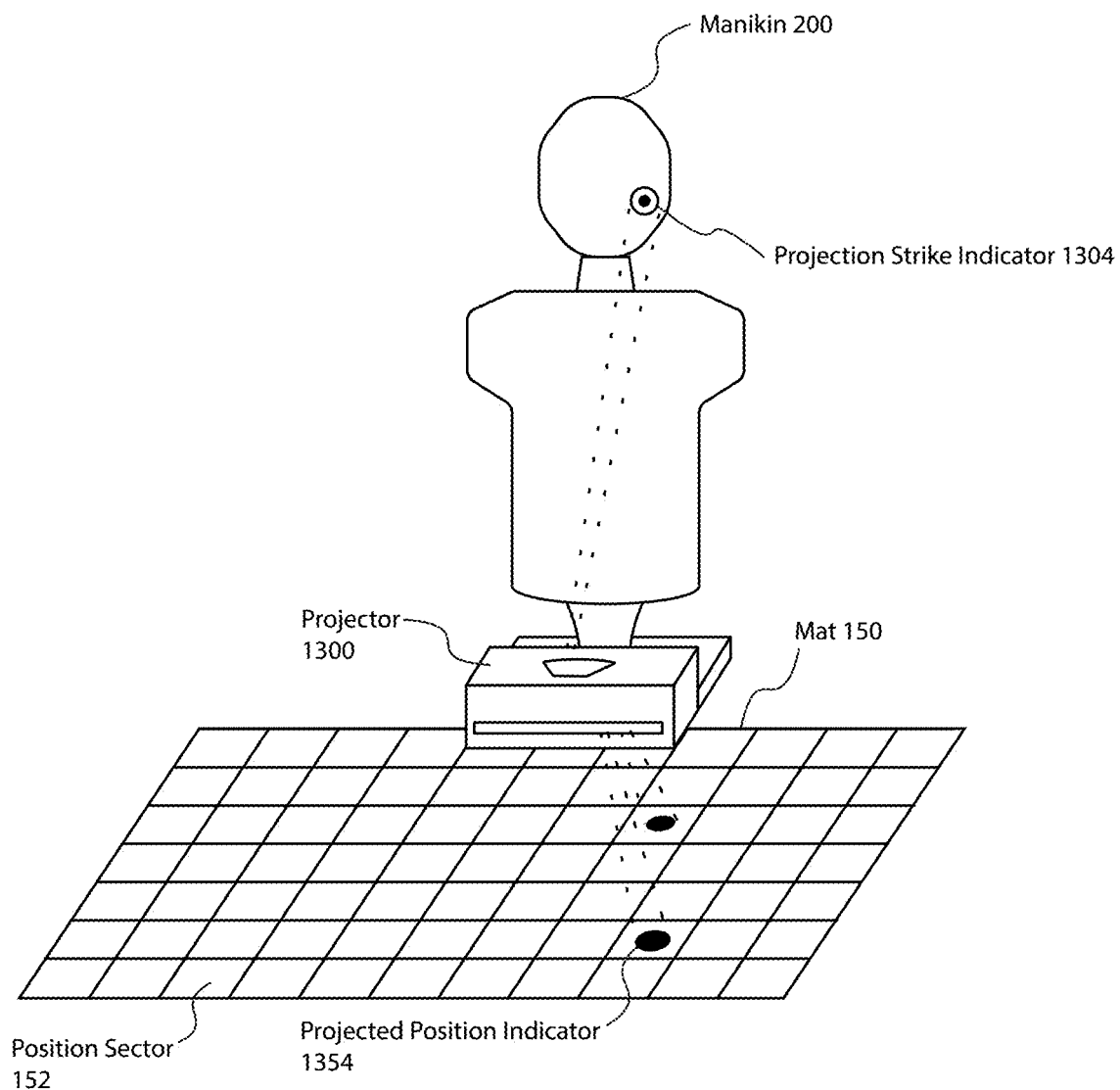
FIG. 13 illustrates a projection overlay system in which a projector applies a projection strike indicator to the manikin and/or a projected position indicator to the mat, according to one or more embodiments.

FIG. 13 illustrates a projection overlay system 1350, according to one or more embodiments. In the embodiment of FIG. 3, a projector 1300 may comprise a first projection element (unlabeled) projecting on the manikin 200 and a second projecting element (unlabeled) projecting on the mat 150. For example, the projector 1300 may project the strike indicator 104, shown as the projection strike indicator 1304. Similarly, the projector 1300 may project the position indicator 154, shown as the projection position indicator 1454. The projector 1300 may also provide additional designation of the strike sectors 102, and/or the position sectors 152, according to one or more embodiments. Although the projector 1300 is shown positioned in front of the manikin 200 with a short "throw distance", the projector 1300 may be positioned in another location. For example, in one or more embodiments, the projector may be distant from the manikin 200, for example on an opposite side of the mat 150 and/or projecting down from a ceiling. The projector 1300 may be capable of video-quality projection, or may project light and/or lasers to provide the indications.

FIG. 14 illustrates a training and workout system 1450, according to one or more embodiments. The training and workout system 1450 comprises a foam combat dummy with embedded lights, sensors, and electronics implementing the manikin 200, along with a rubber instance of the mat implementing the mat 150 of FIG. 1. The head 1401 may include the accelerometer 211 which may be able to detect the nature and quality of an extremity strike to the head 1401, including the direction and force of the extremity strike. The torso 1403 may include seven instances the strike sector 102, each with a visual instance of the strike indicator 104 and a strike detector 110 (which may be within an inch of the strike indicator 104). The connector 1406 may be a collared fixture that houses a heavy spring to provide some recoil and/or "give" in response to the extremity strike. The base 1405 may be weighted, and further house the control unit 500 on the inside of the base 1405. The display 1422 is shown set into the base 1405, and may be protected with a transparent impact shield. In the embodiment of FIG. 14, the control unit 500 may be provided by a tablet device (e.g., the device 560 of FIG. 5, for example an iPad®) that may control the manikin 200, store the training files 600 and/or the performance file 625, and additional instructional videos or materials. The tablet device may be hooked to additional powered speakers to raise the volume of the speaker 520 to a sufficient level to be heard by the user during the combat training, including in what may be a loud environment such as a gym. The mat 150 of FIG. 1 may be foam rubber with an adhered cloth layer with graphics and/or designs, including the position indicator 154 and the position detector 160 (e.g., a pressure sensor) embedded in the foam rubber, e.g., in voids or channels molded, cut, or otherwise made through the foam rubber. The position indicator 154 may be one or more LEDs invisible when unlit but visible through the adhered cloth layer when illuminated, according to one or more embodiments.

Figure 15:
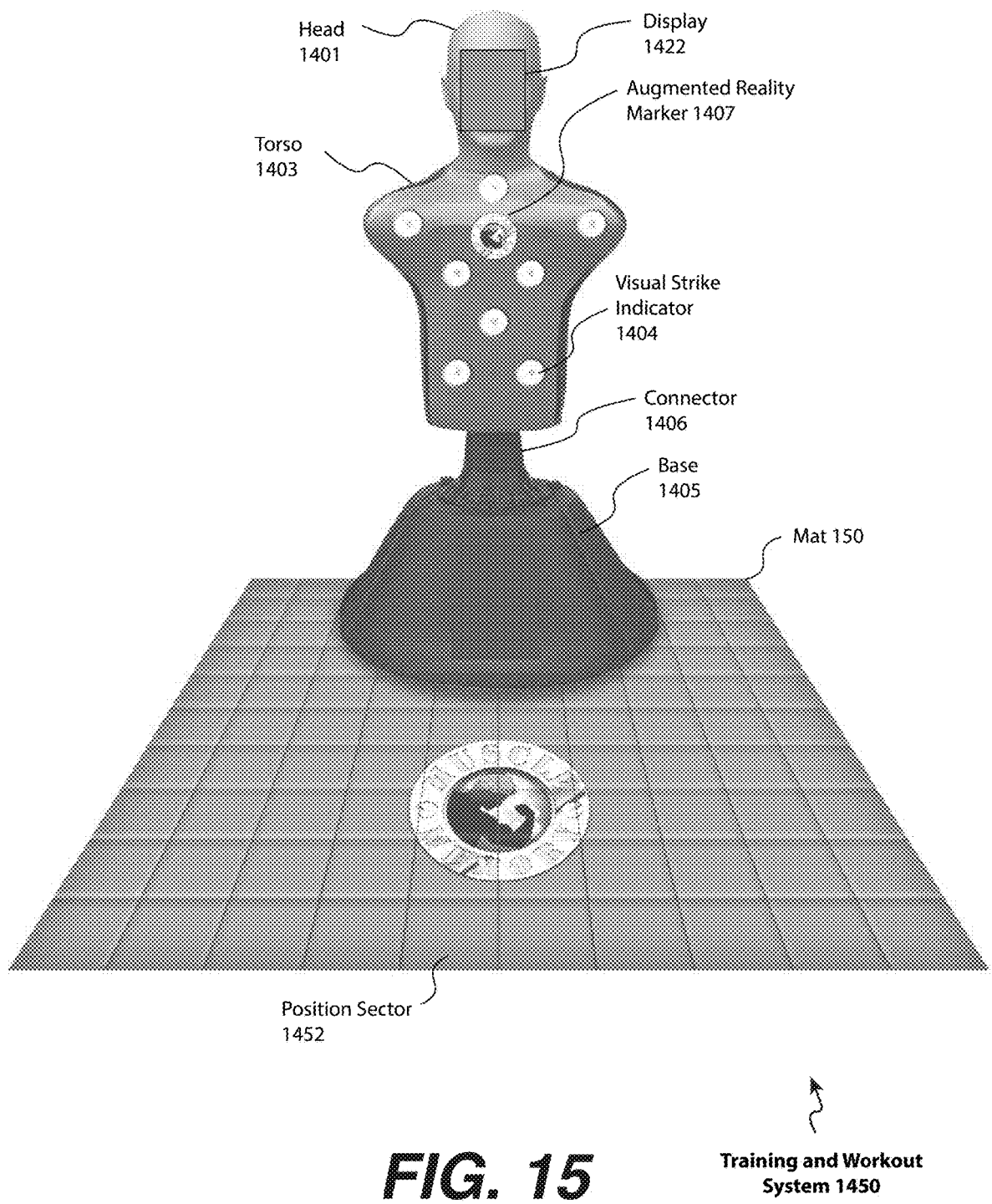
FIG. 15 illustrates another instance of a training and workout system that may be a specific example embodiment of the strike target and the mat, according to one or more embodiments.

FIG. 15 illustrates another example of the training and workout system 1450, according to one or more embodiments. In one or more embodiments, the manikin may also include the display 1422 embedded in the head 1401, and protected by a transparent impact shield for displaying a face image.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the control unit 500, the device 560, the machine learning server 570, the device controller 702). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. A system for combat training, athletic training, or workouts, comprising:
a manikin comprising a first set of one or more strike sectors capable of sustaining a strike from a human extremity, each of the first set of one or more strike sectors comprising a strike detector of the manikin and an augment marker to provide a strike indication to a user applying the strike,
wherein the augment marker is visible in association with the manikin for positioning an augment image on at least one of a display screen and a transparency screen of a device when the manikin is visible to a camera of the device,
a mat comprising one or more position sectors each comprising a position detector and a position indicator to provide a position indication of a foot placement for a foot of the user,
a control unit communicatively coupled to the strike detector of the manikin and the position detector of the mat, comprising:
a processor,
a memory storing a training file and the memory further storing computer readable instructions that when executed on the processor, causes the processor to:
initiate the training file to provide at least one of a combat training, an athletic training, and a workout;
read a strike sector from the training file;
communicate to the user a position sector of the one or more position sectors for the foot placement of the user and a strike sector of the first set of one or more strike sectors to receive the strike from the human extremity of the user;
receive a first strike signal of the strike generated by the strike detector of the manikin; and
at least one of record the first strike signal in a first strike data and communicate the first strike data to the user,
wherein the augment image and the communication to the user of the strike sector to receive the strike comprises overlaying the augment image on the manikin.

2. The system of claim 1,
wherein the manikin further comprises a first lighting element embedded in the manikin and communication to the user of the strike sector to receive the strike further comprises illuminating the first lighting element embedded in the manikin, and
wherein the position indicator comprising a second lighting element embedded in the mat and communication to the user of the position sector for the foot placement comprises illuminating the second lighting element embedded in the mat.

3. The system of claim 2, wherein the memory further storing computer readable instructions that when executed on the processor cause the processor to:
receive a first position signal of the foot placement generated by the position detector; and
at least one of record the first position signal in a first position data and communicate the first position data to the user.

4. The system of claim 3, further comprising:
an extremity device that is wearable on the human extremity, which is communicatively coupled to the control unit through a network, the extremity device comprising:
a device controller,
a strike detector of the extremity device that upon the strike from the human extremity wearing the extremity device, generates a second strike data and
a network interface controller for communicating the second strike data to the control unit,
wherein the memory further storing computer readable instructions that when executed on the processor cause the processor to:
at least one of record the second strike data and communicate the second strike data to the user.

5. The system of claim 1, further comprising:
a head of the manikin,
a torso of the manikin,
a base coupled to the torso,
an impact dampener connecting the base and the torso, wherein the impact dampener comprises a spring, and
at least one pressure sensor measuring a pressure of the strike.

6. The system of claim 5, further comprising:
an accelerometer measuring an acceleration of at least one of the manikin, the head, and the torso following the strike, and
a display screen embedded in the head and protected by a transparent impact shield for displaying a face image.

7. The system of claim 1, further comprising:
a speaker communicatively coupled to the control unit,
wherein the memory further comprising an audio file and audio designation data associated with the strike sector, and
wherein the memory further storing computer readable instructions that when executed on the processor generates a sector callout on the speaker announcing the strike sector to receive the strike.

8. The system of claim 1, wherein
the strike detector of the manikin detects the strike by detecting proximity with at least one of a first article wearable on a hand of the user and a second article wearable on the foot of the user,
the position detector detects an extremity placement by detecting proximity with at least one of the first article wearable on the hand of the user and the second article wearable on the foot of the user, and
the control unit implemented as an application of a mobile device communicatively coupled to the manikin and the mat through a wireless network connection.

9. A system for combat training, athletic training, or workouts, comprising:
a manikin comprising a first set of one or more strike sectors capable of sustaining a strike from a human extremity, each of the first set of one or more strike sectors comprising a strike detector of the manikin and a strike indicator to provide a strike indication to a user applying the strike,
a mat comprising one or more position sectors each comprising a position detector and an augment marker to provide a position indication of a foot placement for a foot of the user,
wherein the augment marker is visible in association with the mat for positioning an augment image on at least one of a display screen and a transparency screen of a device when the mat is visible to a camera of the device,
a control unit communicatively coupled to the strike detector of the manikin and the position detector of the mat, comprising:
a processor,
a memory storing a training file and the memory further storing computer readable instructions that when executed on the processor, causes the processor to:
initiate the training file to provide at least one of a combat training, an athletic training, and a workout;
read a strike sector from the training file;
communicate to the user a position sector of the one or more position sectors for the foot placement of the user and a strike sector of the first set of one or more strike sectors to receive the strike from the human extremity of the user;
receive a first strike signal of the strike generated by the strike detector of the manikin; and
at least one of record the first strike signal in a first strike data and communicate the first strike data to the user,
wherein the augment image and the communication to the user of the position sector for the foot placement of the user comprises overlaying the augment image on the mat.

10. The system of claim 9,
wherein the strike indicator comprising a first lighting element embedded in the manikin and communication to the user of the strike sector to receive the strike comprises illuminating the first lighting element embedded in the manikin, and
wherein the mat further comprises a second lighting element embedded in the mat and communication to the user of the position sector for the foot placement further comprises illuminating the second lighting element embedded in the mat.

11. The system of claim 10, wherein the memory further storing computer readable instructions that when executed on the processor:
receive a first position signal of the foot placement generated by the position detector; and
at least one of record the first position signal in a first position data and communicate the first position data to the user.

12. The system of claim 11, further comprising:
an extremity device that is wearable on the human extremity, which is communicatively coupled to the control unit through a network, the extremity device comprising:
a device controller,
a strike detector of the extremity device that upon the strike from the human extremity wearing the extremity device generates a second strike data, and
a network interface controller for communicating the second strike data to the control unit,
wherein the extremity device is at least one of a glove, an elbow pad, a knee pad, a sock, and a shoe, and
wherein the memory further storing computer readable instructions that when executed on the processor cause the processor to:
at least one of record the second strike data and communicate the second strike data to the user.

13. The system of claim 9, further comprising:
a head of the manikin,
a torso of the manikin, a base coupled to the torso,
an impact dampener connecting the base and the torso, wherein the impact dampener comprises a spring, and
at least one pressure sensor measuring a pressure of the strike.

14. The system of claim 13, further comprising:
an accelerometer measuring an acceleration of at least one of the manikin, the head, and the torso following the strike, and
a display screen embedded in the head and protected by a transparent impact shield for displaying a face image.

15. The system of claim 9, further comprising:
a speaker communicatively coupled to the control unit,
wherein the memory further comprising an audio file and audio designation data associated with the strike sector, and
wherein the memory further storing computer readable instructions that when executed on the processor generates a sector callout on the speaker announcing the strike sector to receive the strike.

16. The system of claim 9, wherein
the strike detector of the manikin detects the strike by detecting proximity with at least one of a first article wearable on a hand of the user and a second article wearable on the foot of the user, the position detector detects an extremity placement by detecting proximity with at least one of the first article wearable on the hand of the user and the second article wearable on the foot of the user, and the control unit implemented as an application of a mobile device communicatively coupled to the manikin and the mat through a wireless network connection.

\* \* \* \* \*